(12) United States Patent
Proctor, Jr. et al.

(10) Patent No.: US 8,908,654 B2
(45) Date of Patent: Dec. 9, 2014

(54) DYNAMIC BANDWIDTH ALLOCATION FOR MULTIPLE ACCESS COMMUNICATIONS USING BUFFER URGENCY FACTOR

(75) Inventors: James A. Proctor, Jr., Melbourne Beach, FL (US); Lawrence R. Foore, Bay Village, OH (US); Thomas E. Gorsuch, Merritt Island, FL (US); Carlo Amalfitano, Melbourne Beach, FL (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 13/554,602

(22) Filed: Jul. 20, 2012

(65) Prior Publication Data

US 2013/0182682 A1   Jul. 18, 2013

Related U.S. Application Data

(63) Continuation of application No. 10/767,016, filed on Jan. 29, 2004, now Pat. No. 8,259,687, which is a
(Continued)

(51) Int. Cl.
*H04J 13/16* (2011.01)
*H04W 72/04* (2009.01)
(Continued)

(52) U.S. Cl.
CPC .......... *H04W 72/04* (2013.01); *H04W 72/0406* (2013.01); *H04J 3/1682* (2013.01); *H04J 13/16*
(Continued)

(58) Field of Classification Search
CPC .......... H04J 13/16–13/13; H04J 13/18; H04L 1/165; H04W 72/0466; H04W 28/22; H04W 72/04

USPC .......... 370/335–348, 395.3–395.53, 329–332, 370/349; 455/452.1, 445.5, 466, 476–561
See application file for complete search history.

(56) References Cited

U.S. PATENT DOCUMENTS 3,560,978 A    2/1971  Himmel et al.
3,725,938 A    4/1973  Black et al.
(Continued)

FOREIGN PATENT DOCUMENTS

DE    4426183    10/1995
DE    19907085    4/2000
(Continued)

OTHER PUBLICATIONS

Official Action & Search Report for Norwegian Patent Application No. 20033238, mailed Sep. 19, 2013, 8 pages.
(Continued)

*Primary Examiner* — Asfar M Qureshi
(74) *Attorney, Agent, or Firm* — Blakely, Sokoloff, Taylor & Zafman LLP

(57) ABSTRACT

A code division multiple access (CDMA) user device configured to dynamically allocating at least one wireless communication channel to permit a more efficient allocation of wireless communication channels when providing high speed data service. The CDMA user device is configured to receive data traffic from at least one data buffer in a base station. The CDMA user device is dynamically allocated at least one wireless communication channel based on an urgency factor. The urgency factor indicates the urgency of traffic data to be transmitted from the at least one data buffer in the base station to the CDMA user device.

7 Claims, 9 Drawing Sheets

Related U.S. Application Data continuation of application No. 10/345,810, filed on Jan. 16, 2003, now abandoned, which is a continuation of application No. 09/773,252, filed on Jan. 31, 2001, now Pat. No. 6,542,481, which is a continuation-in-part of application No. 09/088,527, filed on Jun. 1, 1998, now Pat. No. 6,388,999.

(51) Int. Cl.

| | | |
|---|---|---|
| *H04J 3/16* | (2006.01) | |
| *H04L 1/00* | (2006.01) | |
| *H04L 1/16* | (2006.01) | |
| *H04L 1/18* | (2006.01) | |
| *H04L 12/54* | (2013.01) | |
| *H04L 25/14* | (2006.01) | |
| *H04L 12/801* | (2013.01) | |
| *H04L 12/835* | (2013.01) | |
| *H04L 12/923* | (2013.01) | |
| *H04L 12/927* | (2013.01) | |
| *H04L 12/911* | (2013.01) | |
| *H04Q 11/04* | (2006.01) | |
| *H04W 72/12* | (2009.01) | |
| *H04W 24/00* | (2009.01) | |
| *H04W 28/06* | (2009.01) | |
| *H04W 28/14* | (2009.01) | |
| *H04W 74/00* | (2009.01) | |
| *H04W 76/02* | (2009.01) | |
| *H04W 80/00* | (2009.01) | |
| *H04W 84/14* | (2009.01) | |

(52) U.S. Cl.
CPC ..... (2013.01); *H04L 1/0007* (2013.01); *H04L 1/165* (2013.01); *H04L 1/1809* (2013.01); *H04L 12/5695* (2013.01); *H04L 25/14* (2013.01); *H04L 47/14* (2013.01); *H04L 47/29* (2013.01); *H04L 47/30* (2013.01); *H04L 47/762* (2013.01); *H04L 47/803* (2013.01); *H04L 47/824* (2013.01); *H04Q 11/0428* (2013.01); *H04Q 2213/13098* (2013.01); *H04Q 2213/13202* (2013.01); *H04Q 2213/13204* (2013.01); *H04Q 2213/13209* (2013.01); *H04Q 2213/13216* (2013.01); *H04Q 2213/1327* (2013.01); *H04Q 2213/13298* (2013.01); *H04Q 2213/13332* (2013.01); *H04Q 2213/1336* (2013.01); *H04Q 2213/13389* (2013.01); *H04W 24/00* (2013.01); *H04W 28/06* (2013.01); *H04W 28/14* (2013.01); *H04W 72/0453* (2013.01); *H04W 72/0486* (2013.01); *H04W 72/1242* (2013.01); *H04W 74/00* (2013.01); *H04W 76/02* (2013.01); *H04W 80/00* (2013.01); *H04W 84/14* (2013.01)
USPC ............................. 370/335; 370/329; 370/341

(56) References Cited

U.S. PATENT DOCUMENTS

| | | | |
|---|---|---|---|
| 3,742,498 A | 6/1973 | Dunn | |
| 3,846,799 A | 11/1974 | Gueguen | |
| 3,950,753 A | 4/1976 | Chisholm | |
| 4,021,813 A | 5/1977 | Black et al. | |
| 4,099,184 A | 7/1978 | Rapshys | |
| 4,107,469 A | 8/1978 | Jenkins | |
| 4,170,766 A | 10/1979 | Pridham et al. | |
| 4,260,994 A | 4/1981 | Parker | |
| 4,290,071 A | 9/1981 | Fenwick | |
| 4,387,378 A | 6/1983 | Henderson | |
| 4,448,155 A | 5/1984 | Hillebrand et al. | |
| 4,577,316 A | 3/1986 | Schiff | |
| 4,599,733 A | 7/1986 | Gutleber | |
| 4,625,308 A | 11/1986 | Kim et al. | |
| 4,631,546 A | 12/1986 | Dumas et al. | |
| 4,642,806 A | 2/1987 | Hewitt et al. | |
| 4,675,863 A | 6/1987 | Paneth et al. | |
| 4,700,197 A | 10/1987 | Milne | |
| 4,817,089 A | 3/1989 | Paneth et al. | |
| 4,841,526 A | 6/1989 | Wilson et al. | |
| 4,862,453 A | 8/1989 | West et al. | |
| 4,866,709 A | 9/1989 | West et al. | |
| 4,887,266 A | 12/1989 | Neve et al. | |
| 4,912,705 A | 3/1990 | Paneth et al. | |
| 4,949,395 A | 8/1990 | Rydbeck | |
| 4,954,950 A | 9/1990 | Freeman et al. | |
| 5,022,024 A | 6/1991 | Paneth et al. | |
| 5,027,125 A | 6/1991 | Tang | |
| 5,027,348 A | 6/1991 | Curry | |
| 5,027,400 A | 6/1991 | Baji et al. | |
| 5,038,149 A | 8/1991 | Aubry et al. | |
| 5,056,109 A | 10/1991 | Gilhousen et al. | |
| 5,068,916 A | 11/1991 | Harrison et al. | |
| 5,101,416 A | 3/1992 | Fenton et al. | |
| 5,103,459 A | 4/1992 | Gilhousen et al. | |
| 5,114,375 A | 5/1992 | Wellhausen et al. | |
| 5,115,309 A | 5/1992 | Hang | |
| 5,117,236 A | 5/1992 | Chang et al. | |
| 5,124,981 A | 6/1992 | Golding | |
| 5,130,983 A | 7/1992 | Heffner, III | |
| 5,166,929 A | 11/1992 | Lo | |
| 5,226,044 A | 7/1993 | Gupta et al. | |
| 5,235,343 A | 8/1993 | Audren et al. | |
| 5,257,283 A | 10/1993 | Gilhousen et al. | |
| 5,267,262 A | 11/1993 | Wheatley, III | |
| 5,268,900 A | 12/1993 | Hluchyj et al. | |
| 5,280,472 A | 1/1994 | Gilhousen et al. | |
| 5,282,222 A | 1/1994 | Fattouche et al. | |
| 5,293,172 A | 3/1994 | Lamberty et al. | |
| 5,294,939 A | 3/1994 | Sanford | |
| 5,303,240 A | 4/1994 | Borras et al. | |
| 5,309,474 A | 5/1994 | Gilhousen et al. | |
| 5,325,394 A | 6/1994 | Bruckert | |
| 5,325,419 A | 6/1994 | Connolly et al. | |
| 5,337,316 A | 8/1994 | Weiss et al. | |
| 5,339,316 A | 8/1994 | Diepstraten | |
| 5,353,332 A | 10/1994 | Raith et al. | |
| 5,355,374 A | 10/1994 | Hester et al. | |
| 5,369,637 A * | 11/1994 | Richardson et al. | 370/281 |
| 5,373,502 A | 12/1994 | Turban | |
| 5,375,124 A | 12/1994 | D'Ambrogio et al. | |
| 5,377,192 A | 12/1994 | Goodings et al. | |
| 5,388,102 A | 2/1995 | Griffith et al. | |
| 5,394,473 A | 2/1995 | Davidson | |
| 5,412,429 A | 5/1995 | Glover | |
| 5,414,728 A | 5/1995 | Zehavi | |
| 5,422,887 A | 6/1995 | Diepstraten et al. | |
| 5,430,452 A | 7/1995 | DuBois | |
| 5,437,055 A | 7/1995 | Wheatley, III | |
| 5,439,569 A | 8/1995 | Carpio | |
| 5,442,625 A * | 8/1995 | Gitlin et al. | 370/342 |
| 5,446,727 A | 8/1995 | Bruckert et al. | |
| 5,463,629 A | 10/1995 | Ko | |
| 5,471,463 A | 11/1995 | Hulbert | |
| 5,479,176 A | 12/1995 | Zavrel, Jr. | |
| 5,481,533 A | 1/1996 | Honig | |
| 5,487,180 A | 1/1996 | Ohtake | |
| 5,490,136 A | 2/1996 | Sereno et al. | |
| 5,493,569 A | 2/1996 | Buchholz et al. | |
| 5,502,447 A | 3/1996 | Kumpfbeck et al. | |
| 5,511,068 A | 4/1996 | Sato | |
| 5,537,397 A | 7/1996 | Abramson | |
| 5,537,414 A | 7/1996 | Takiyasu et al. | |
| 5,546,382 A | 8/1996 | Fujino | |
| 5,550,828 A | 8/1996 | Gries et al. | |
| 5,559,789 A | 9/1996 | Nakano et al. | |
| 5,577,022 A | 11/1996 | Padovani et al. | |
| 5,581,575 A | 12/1996 | Zehavi et al. | |
| 5,585,850 A | 12/1996 | Schwaller | |
| 5,586,113 A * | 12/1996 | Adachi et al. | 370/342 |

(56) References Cited

U.S. PATENT DOCUMENTS

| | | |
|---|---|---|
| 5,586,119 A | 12/1996 | Scribano et al. |
| 5,590,156 A | 12/1996 | Carney |
| 5,590,409 A | 12/1996 | Sawahashi et al. |
| 5,592,178 A | 1/1997 | Chang et al. |
| 5,592,468 A | 1/1997 | Sato |
| 5,592,470 A | 1/1997 | Rudrapatna et al. |
| 5,592,471 A | 1/1997 | Briskman |
| 5,594,782 A | 1/1997 | Zicker et al. |
| 5,598,416 A | 1/1997 | Yamada et al. |
| 5,598,417 A | 1/1997 | Crisler et al. |
| 5,603,081 A | 2/1997 | Raith et al. |
| 5,604,730 A | 2/1997 | Tiedemann, Jr. |
| 5,606,580 A | 2/1997 | Mourot et al. |
| 5,608,722 A | 3/1997 | Miller |
| 5,617,102 A | 4/1997 | Prater |
| 5,617,423 A | 4/1997 | Li et al. |
| 5,619,492 A | 4/1997 | Press et al. |
| 5,619,524 A | 4/1997 | Ling et al. |
| 5,621,752 A | 4/1997 | Antonio |
| 5,634,199 A | 5/1997 | Gerlach et al. |
| 5,642,348 A | 6/1997 | Barzegar et al. |
| 5,642,377 A | 6/1997 | Chung et al. |
| 5,652,764 A | 7/1997 | Kanzaki et al. |
| 5,655,001 A | 8/1997 | Cline et al. |
| 5,657,326 A | 8/1997 | Burns et al. |
| 5,657,358 A | 8/1997 | Panech et al. |
| 5,663,958 A | 9/1997 | Ward |
| 5,663,990 A | 9/1997 | Bolgiano et al. |
| 5,673,259 A * | 9/1997 | Quick, Jr. .................. 370/342 |
| 5,680,142 A | 10/1997 | Smith et al. |
| 5,684,794 A | 11/1997 | Lopez et al. |
| 5,687,194 A | 11/1997 | Paneth et al. |
| 5,689,502 A | 11/1997 | Scott |
| 5,697,059 A | 12/1997 | Carney |
| 5,699,364 A | 12/1997 | Sato et al. |
| 5,708,656 A | 1/1998 | Noneman et al. |
| 5,712,869 A | 1/1998 | Lee et al. |
| 5,715,236 A | 2/1998 | Gilhousen et al. |
| 5,715,526 A | 2/1998 | Weaver, Jr. et al. |
| 5,726,981 A | 3/1998 | Ylitervo et al. |
| 5,729,541 A | 3/1998 | Hamalainen et al. |
| 5,734,646 A | 3/1998 | I et al. |
| 5,739,784 A | 4/1998 | Jan et al. |
| 5,742,592 A | 4/1998 | Scholefield et al. |
| 5,745,484 A | 4/1998 | Scott |
| 5,748,624 A | 5/1998 | Kondo |
| 5,757,767 A | 5/1998 | Zehavi |
| 5,758,288 A | 5/1998 | Dunn et al. |
| 5,764,648 A | 6/1998 | Yamane et al. |
| 5,767,807 A | 6/1998 | Pritchett |
| 5,781,542 A | 7/1998 | Tanaka et al. |
| 5,781,543 A | 7/1998 | Ault et al. |
| 5,784,406 A | 7/1998 | DeJaco et al. |
| 5,790,549 A | 8/1998 | Dent |
| 5,790,551 A | 8/1998 | Chan |
| 5,793,744 A | 8/1998 | Kanerva et al. |
| 5,796,776 A | 8/1998 | Lomp et al. |
| 5,799,010 A | 8/1998 | Lomp et al. |
| 5,802,046 A | 9/1998 | Scott |
| 5,802,465 A | 9/1998 | Hamalainen et al. |
| 5,805,583 A | 9/1998 | Rakib |
| 5,805,994 A | 9/1998 | Perreault et al. |
| 5,809,415 A | 9/1998 | Rossmann |
| 5,812,131 A | 9/1998 | Bertram |
| 5,812,543 A | 9/1998 | Sugita |
| 5,825,807 A | 10/1998 | Kumar |
| 5,828,659 A | 10/1998 | Teder et al. |
| 5,828,662 A | 10/1998 | Jalali et al. |
| 5,838,720 A | 11/1998 | Morelli |
| 5,841,768 A | 11/1998 | Ozluturk et al. |
| 5,844,894 A | 12/1998 | Dent |
| 5,845,211 A | 12/1998 | Roach |
| 5,854,786 A | 12/1998 | Henderson et al. |
| 5,856,971 A | 1/1999 | Gitlin et al. |
| 5,859,840 A | 1/1999 | Tiedemann, Jr. et al. |
| 5,859,879 A | 1/1999 | Bolgiano et al. |
| 5,862,488 A | 1/1999 | Kotzin et al. |
| 5,870,427 A | 2/1999 | Tiedemann, Jr. et al. |
| 5,872,786 A | 2/1999 | Shobatake |
| 5,881,060 A | 3/1999 | Morrow et al. |
| 5,896,376 A | 4/1999 | Alperovich et al. |
| 5,905,719 A | 5/1999 | Arnold et al. |
| 5,910,945 A | 6/1999 | Garrison et al. |
| 5,914,950 A | 6/1999 | Tiedemann, Jr. et al. |
| 5,923,650 A | 7/1999 | Chen et al. |
| 5,930,230 A | 7/1999 | Odenwalder et al. |
| 5,946,356 A | 8/1999 | Felix et al. |
| 5,950,131 A | 9/1999 | Vilmur |
| 5,956,332 A | 9/1999 | Rasanen et al. |
| 5,963,549 A | 10/1999 | Perkins et al. |
| 5,966,374 A | 10/1999 | Rasanen |
| 5,991,279 A | 11/1999 | Haugli et al. |
| 5,991,618 A | 11/1999 | Hall |
| 6,001,800 A | 12/1999 | Mehta et al. |
| 6,002,690 A | 12/1999 | Takayama et al. |
| 6,005,848 A | 12/1999 | Grube et al. |
| 6,005,855 A | 12/1999 | Zehavi et al. |
| 6,009,106 A | 12/1999 | Rustad et al. |
| 6,011,788 A | 1/2000 | Hurst et al. |
| 6,011,800 A | 1/2000 | Nadgauda et al. |
| 6,023,462 A | 2/2000 | Nieczyporowicz et al. |
| 6,023,474 A | 2/2000 | Gardner et al. |
| 6,028,853 A | 2/2000 | Haartsen |
| 6,028,868 A | 2/2000 | Yeung et al. |
| 6,031,832 A | 2/2000 | Turina |
| 6,038,455 A | 3/2000 | Gardner et al. |
| 6,049,535 A | 4/2000 | Ozukturk et al. |
| 6,052,385 A | 4/2000 | Kanerva et al. |
| 6,058,104 A | 5/2000 | Snelling et al. |
| 6,061,339 A | 5/2000 | Nieczyporowicz et al. |
| 6,064,678 A | 5/2000 | Sindhushayana et al. |
| 6,069,883 A | 5/2000 | Ejzak et al. |
| 6,078,572 A | 6/2000 | Tanno et al. |
| 6,081,536 A | 6/2000 | Gorsuch et al. |
| 6,088,335 A | 7/2000 | I et al. |
| 6,097,722 A | 8/2000 | Graham et al. |
| 6,097,733 A * | 8/2000 | Basu et al. ................... 370/468 |
| 6,111,863 A | 8/2000 | Rostoker et al. |
| 6,112,092 A | 8/2000 | Benveniste |
| 6,122,330 A | 9/2000 | Motohashi |
| 6,125,148 A | 9/2000 | Frodigh et al. |
| 6,134,233 A | 10/2000 | Kay |
| 6,151,332 A | 11/2000 | Gorsuch et al. |
| 6,157,619 A | 12/2000 | Ozluturk et al. |
| 6,161,013 A | 12/2000 | Anderson et al. |
| 6,181,683 B1 | 1/2001 | Chevillat et al. |
| 6,185,184 B1 | 2/2001 | Mattaway et al. |
| 6,185,196 B1 | 2/2001 | Mademann |
| 6,195,362 B1 | 2/2001 | Darcie et al. |
| 6,198,723 B1 | 3/2001 | Parruck et al. |
| 6,198,728 B1 | 3/2001 | Hulyalkar et al. |
| 6,208,871 B1 | 3/2001 | Hall et al. |
| 6,214,778 B1 | 4/2001 | Todd |
| 6,215,778 B1 | 4/2001 | Lomp et al. |
| 6,215,798 B1 | 4/2001 | Carneheim et al. |
| 6,222,828 B1 | 4/2001 | Ohlson et al. |
| 6,222,832 B1 | 4/2001 | Proctor |
| 6,236,647 B1 | 5/2001 | Amalfitano |
| 6,243,372 B1 | 6/2001 | Petch et al. |
| 6,249,681 B1 | 6/2001 | Virtanen |
| 6,256,334 B1 | 7/2001 | Adachi |
| 6,259,683 B1 | 7/2001 | Sekine et al. |
| 6,262,980 B1 | 7/2001 | Leung et al. |
| 6,269,088 B1 | 7/2001 | Masui et al. |
| 6,272,168 B1 | 8/2001 | Lomp et al. |
| 6,285,665 B1 | 9/2001 | Chuah |
| 6,292,474 B1 | 9/2001 | Ali et al. |
| 6,307,840 B1 | 10/2001 | Wheatley, III et al. |
| 6,310,859 B1 | 10/2001 | Morita et al. |
| 6,314,300 B1 | 11/2001 | Nakashima et al. |
| 6,335,922 B1 | 1/2002 | Tiedemann, Jr. et al. |
| 6,339,612 B1 | 1/2002 | Stewart et al. |
| 6,366,570 B1 | 4/2002 | Bhagalia |
| 6,370,117 B1 | 4/2002 | Koraitim et al. |

(56) References Cited

U.S. PATENT DOCUMENTS

| | | | |
|---|---|---|---|
| 6,373,830 B1 | 4/2002 | Ozluturk | |
| 6,373,834 B1 | 4/2002 | Lundh et al. | |
| 6,377,548 B1 | 4/2002 | Chuah | |
| 6,377,809 B1 | 4/2002 | Rezaiifar et al. | |
| 6,388,999 B1 | 5/2002 | Gorsuch et al. | |
| 6,389,000 B1 | 5/2002 | Jou | |
| 6,396,804 B2 | 5/2002 | Odenwalder | |
| 6,418,148 B1 | 7/2002 | Kumar et al. | |
| 6,456,608 B1 | 9/2002 | Lomp | |
| 6,469,991 B1 | 10/2002 | Chuah | |
| 6,473,623 B1 | 10/2002 | Benveniste | |
| 6,504,830 B1 | 1/2003 | Östberg et al. | |
| 6,519,651 B1 | 2/2003 | Dillon | |
| 6,526,039 B1 | 2/2003 | Dahlman et al. | |
| 6,526,064 B1 | 2/2003 | Bousquet | |
| 6,526,281 B1 | 2/2003 | Gorsuch et al. | |
| 6,532,365 B1 | 3/2003 | Anderson et al. | |
| 6,542,481 B2 | 4/2003 | Foore et al. | |
| 6,545,986 B1 | 4/2003 | Stellakis | |
| 6,567,416 B1 | 5/2003 | Chuah | |
| 6,570,865 B2 * | 5/2003 | Masui et al. | 370/342 |
| 6,571,296 B1 | 5/2003 | Dillon | |
| 6,574,211 B2 | 6/2003 | Padovani et al. | |
| 6,597,913 B2 | 7/2003 | Natarajan | |
| 6,845,104 B2 | 1/2005 | Johnson et al. | |
| 6,973,140 B2 | 12/2005 | Hoffman et al. | |
| 7,027,420 B2 | 4/2006 | Hamalainen | |
| 7,054,293 B2 | 5/2006 | Tiedemann, Jr. et al. | |
| 7,079,523 B2 | 7/2006 | Nelson, Jr. | |
| 7,136,377 B1 | 11/2006 | Tweedly et al. | |
| 7,218,623 B1 | 5/2007 | Proctor, Jr. | |
| 7,221,664 B2 | 5/2007 | Proctor, Jr. | |
| 2001/0039191 A1 | 11/2001 | Maierhofer | |
| 2002/0009096 A1 | 1/2002 | Odenwalder | |
| 2002/0045441 A1 | 4/2002 | Ralston et al. | |
| 2004/0160910 A1 | 8/2004 | Gorsuch et al. | |
| 2004/0180696 A1 | 9/2004 | Foore et al. | |
| 2005/0202823 A1 | 9/2005 | Shaheen et al. | |
| 2008/0225766 A1 | 9/2008 | Roy et al. | |

FOREIGN PATENT DOCUMENTS

| | | |
|---|---|---|
| EP | 443061 | 8/1991 |
| EP | 526106 | 2/1993 |
| EP | 635949 | 1/1995 |
| EP | 682423 | 11/1995 |
| EP | 6822426 | 11/1995 |
| EP | 719062 | 6/1996 |
| EP | 0760564 | 3/1997 |
| EP | 0818901 | 1/1998 |
| EP | 1102512 | 5/2001 |
| FR | 2761557 | 10/1998 |
| GB | 2243973 | 11/1991 |
| JP | 01-221042 | 9/1989 |
| JP | 1221042 | 9/1989 |
| JP | 5-167609 | 7/1993 |
| JP | 7-107546 | 9/1993 |
| JP | 8-140143 | 11/1994 |
| JP | 7-303093 | 4/1995 |
| JP | 07131398 | 5/1995 |
| JP | 865273 | 3/1996 |
| JP | 8-097824 | 4/1996 |
| JP | 8-316966 | 11/1996 |
| JP | 9-55764 | 2/1997 |
| JP | 11150530 | 6/1999 |
| JP | 11331131 | 11/1999 |
| JP | 2000092019 | 3/2000 |
| JP | 2000188597 | 7/2000 |
| JP | 2000-236343 | 8/2000 |
| JP | 2000-286851 | 10/2000 |
| JP | 2002-510447 | 4/2002 |
| JP | 2005504460 | 2/2005 |
| JP | 2007251966 | 9/2007 |
| JP | 5112811 | 1/2013 |
| KR | 1996-0016201 | 5/1996 |
| KR | 1997-0001857 | 2/1997 |
| SU | 1401626 | 6/1988 |
| SU | 1837403 | 8/1993 |
| WO | WO-9315573 | 8/1993 |
| WO | 93/21719 | 10/1993 |
| WO | 95/05053 | 2/1995 |
| WO | 95/07578 | 3/1995 |
| WO | 95/08900 | 3/1995 |
| WO | 95/30289 | 11/1995 |
| WO | 96/08934 | 3/1996 |
| WO | WO-9619050 | 6/1996 |
| WO | WO-9626582 | 8/1996 |
| WO | 96/37081 | 11/1996 |
| WO | WO-9637079 | 11/1996 |
| WO | 96/27994 | 12/1996 |
| WO | 97/32412 | 4/1997 |
| WO | 97/23073 | 6/1997 |
| WO | WO-9734387 | 9/1997 |
| WO | 97/36405 | 10/1997 |
| WO | WO-9736405 | 10/1997 |
| WO | WO-9737456 | 10/1997 |
| WO | 97/46044 | 12/1997 |
| WO | WO-9749201 | 12/1997 |
| WO | 98/59447 | 12/1998 |
| WO | 98/59523 | 12/1998 |
| WO | WO-9859523 | 12/1998 |
| WO | WO-9908398 | 2/1999 |
| WO | 99/44341 | 9/1999 |
| WO | 99/63713 | 12/1999 |
| WO | WO-9963682 | 12/1999 |
| WO | WO-9963713 | 12/1999 |
| WO | WO-0062435 | 10/2000 |
| WO | WO-0062456 | 10/2000 |
| WO | WO-02061993 | 8/2002 |

OTHER PUBLICATIONS

Office Action for Japanese Patent Application No. 2013-002916, mailed Nov. 12, 2013, 4 pages.

Notice of Allowance for U.S. Appl. No. 13/423,859, mailed Feb. 18, 2014, 11 pages.

Examination Report for European Patent Application No. 10180797.2, mailed Jan. 20, 2014, 7 pages.

Non-Final Office Action for U.S. Appl. No. 12/165,422 mailed Jul. 22, 2013, 5 pages.

Non-Final Office Action for U.S. Patent Application No. 12/165,422, mailed Nov. 6, 2013, 5 pages.

Final Office Action for Japanese Application No. 2011-177740, mailed Nov. 12, 2013, 4 pages.

Office Action for Japanese Application No. 2011-177740, mailed Oct. 30, 2012, 12 pages.

Final Office Action for Japanese Application No. 2012-141289, mailed Nov. 12, 2013, 4 pages.

Office Action for Japanese Application No. 2012-141289, mailed Oct. 30, 2012, 11 pages.

Reasons for Rejection for Japanese Application No. 2012-186900, mailed Jun. 11, 2013, 7 pages.

Office Action for Japanese Application No. 2012-186900, mailed Jan. 29, 2013, 3 pages.

Examiner's Report for Canadian Application No. 2,834,031, mailed Jan. 10, 2014, 3 pages.

Final Office Action for U.S. Appl. No. 12/788,716, mailed May 15, 2012, 16 pages.

Office Action for U.S. Appl. No. 12/788,716, mailed Apr. 22, 2011, 14 pages.

Office Action for U.S. Appl. No. 12/788,716, mailed Oct. 20, 2011, 15 pages.

Office Action for U.S. Appl. No. 12/788,716, mailed Apr. 16, 2013, 20 pages.

Office Action for U.S. Appl. No. 12/788,716, mailed Nov. 5, 2013, 4 pages.

Non-Final Office Action issued for U.S. Appl. No. 13/423,859, mailed Jul. 31, 2013, 14 pages.

Exam Report for European Patent Application No. 11162402.9, mailed Sep. 23, 2013, 5 pages.

(56) References Cited

OTHER PUBLICATIONS

Decision of Refusal for Japanese Application No. 2012-186900 mailed Dec. 10, 2013, 8 pages.
Office Action for European Patent Application No. 10180797.2, mailed Mar. 19, 2013, 8 pages.
Extended European Search Report for European Patent Application No. 10180797.2, mailed Oct. 28, 2010, 10 pages.
Final Office Action for U.S. Appl. No. 12/788,716, mailed Mar. 28, 2014, 4 pages.
Notice of Allowance for U.S. Appl. No. 12/165,422, mailed Apr. 4, 2014, 5 pages.
Non-Final Office Action for U.S. Appl. No. 10/171,378 mailed Sep. 28, 2006, 7 pages.
Non-Final Office Action for U.S. Appl. No. 10/171,378 mailed Jun. 27, 2007, 11 pages.
Notice of Allowance for U.S. Appl. No. 10/171,378 mailed Feb. 19, 2008, 6 pages.
Examination Report for Canadian Patent Application No. 2,670,758 mailed May 27, 2013, 3 pages.
Office Action for Canadian Patent Application No. 2,670,758 mailed Jul. 31, 2012, 2 pages.
Office Action for Chinese Patent Application No. 200610091261.4 mailed Nov. 7, 2012, 31 pages.
Office Action for Chinese Patent Application No. 200610091261.4 mailed Aug. 29, 2008, 41 pages.
Extended European Search Report for European Patent Application No. 11156846.5 mailed Mar. 30, 2011, 7 pages.
Office Action for European Patent Application No. 11156846.5 mailed Jan. 5, 2012, 6 pages.
Extended European Search Report for European Patent Application No. 11162402.9, mailed Jun. 1, 2011, 17 pages.
Office Action for European Patent Application No. 11162402.9, mailed Sep. 3, 2012, 4 pages.
Extended European Search Report for European Patent Application No. 11162409.4 mailed Jun. 1, 2011, 10 pages.
Office Action for European Patent Application No. 11162409.4 mailed Sep. 26, 2012, 6 pages.
Final Office Action for Japanese Patent Application No. 2007-270641 mailed Oct. 22, 2010, 8 pages.
Final Office Action for Japanese Patent Application No. 2007-270641 mailed Mar. 30, 2012, 6 pages.
Office Action for Japanese Patent Application No. 2012-000481 mailed Aug. 21, 2012, 6 pages.
Office Action for Japanese Patent Application No. 2012-165134 mailed Jan. 22, 2013, 3 pages.
Search and Examination Report for Singapore Patent Application No. 201004134-1 mailed Oct. 24, 2012, 10 pages.
Non-Final Office Action for U.S. Appl. No. 13/571,164 mailed Oct. 11, 2012, 9 pages.
Notice of Allowance for U.S. Appl. No. 13/571,164 mailed Mar. 20, 2013, 9 pages.
Non-Final Office Action for U.S. Appl. No. 12/498,099 mailed Jan. 7, 2010, 6 pages.
Non-Final Office Action for U.S. Appl. No. 12/498,099 mailed Sep. 15, 2010, 10 pages.
Notice of Allowance for U.S. Appl. No. 12/498,099 mailed May 3, 2012, 8 pages.
Notice of Allowance for U.S. Appl. No. 12/498,099 mailed Jan. 25, 2012, 8 pages.
Notice of Allowance for U.S. Appl. No. 12/498,099 mailed Oct. 17, 2011, 8 pages.
Notice of Allowance for U.S. Appl. No. 12/498,099 mailed May 27, 2011, 9 pages.
Non-Final Office Action for U.S. Appl. No. 10/776,558 mailed Jun. 20, 2006, 5 pages.
Non-Final Office Action for U.S. Appl. No. 10/776,558 mailed Jun. 28, 2007, 6 pages.
Non-Final Office Action for U.S. Appl. No. 10/776,558 mailed Aug. 14, 2008, 6 pages.
Notice of Allowance for U.S. Appl. No. 10/776,558 mailed Feb. 2, 2007, 7 pages.
Notice of Allowance for U.S. Appl. No. 10/776,558 mailed Apr. 7, 2008, 4 pages.
Notice of Allowance for U.S. Appl. No. 10/776,558 mailed Oct. 29, 2008, 6 pages.
Notice of Allowance for U.S. Appl. No. 10/776,558 mailed Apr. 2, 2009, 6 pages.
Supplemental Notice of Allowability for U.S. Appl. No. 10/776,558 mailed Dec. 22, 2008, 2 pages.
Non-Final Office Action for U.S. Appl. No. 10/776,424 mailed Nov. 30, 2006, 4 pages.
Non-Final Office Action for U.S. Appl. No. 10/776,424 mailed Aug. 22, 2007, 5 pages.
Non-Final Office Action for U.S. Appl. No. 10/776,424 mailed Jan. 29, 2008, 6 pages.
Non-Final Office Action for U.S. Appl. No. 10/776,424 mailed Aug. 5, 2008, 5 pages.
Notice of Allowance for U.S. Appl. No. 10/776,424 mailed Oct. 29, 2008, 6 pages.
Non-Final Office Action for U.S. Appl. No. 10/763,788 mailed Dec. 20, 2006, 5 pages.
Non-Final Office Action for U.S. Appl. No. 10/763,788 mailed Oct. 5, 2007, 5 pages.
Non-Final Office Action for U.S. Appl. No. 10/764,196 mailed Oct. 7, 2005, 4 pages.
Non-Final Office Action for U.S. Appl. No. 10/764,196 mailed Jul. 19, 2006, 5 pages.
Restriction Requirement for U.S. Appl. No. 10/764,196 mailed Nov. 30, 2007, 7 pages.
Restriction Requirement for U.S. Appl. No. 10/764,196 mailed Feb. 24, 2009, 7 pages.
Notice of Allowance for U.S. Appl. No. 10/764,196 mailed Apr. 25, 2007, 4 pages.
Notice of Allowance for U.S. Appl. No. 10/764,196 mailed May 19, 2008, 4 pages.
Notice of Allowance for U.S. Appl. No. 10/764,196 mailed Oct. 16, 2008, 6 pages.
Notice of Allowance for U.S. Appl. No. 10/764,196 mailed May 21, 2009, 10 pages.
Examination Report for Canadian Patent Application No. 2,670,758 mailed May 21, 2014, 3 pages.
Examiner's Report for Canadian Patent Application No. 2,700,343 mailed Feb. 8, 2013, 2 pages.
Examiner's Report for Canadian Patent Application No. 2,700,343 mailed Jun. 16, 2014, 3 pages.
Examiner's Report for Canadian Application No. 2,834,031, mailed Jul. 17, 2014, 2 pages.
Official Action for Norwegian Patent Application No. 20083653 mailed Mar. 22, 2014, 4 pages.
Official Action and Search Report for Norwegian Patent Application No. 20083653 mailed Jun. 19, 2013, 10 pages.
Office Action for European Patent Application No. 11162409.4 mailed Mar. 5, 2012, 5 pages.
Office Action for European Patent Application No. 11162402.9, mailed Mar. 5, 2012, 6 pages.
Non-Final Office Action for U.S. Appl. No. 08/992,759 mailed Sep. 16, 1999, 4 pages.
Non-Final Office Action for U.S. Appl. No. 08/992,759 mailed Mar. 19, 1999, 5 pages.
Final Office Action for U.S. Appl. No. 08/992,759 mailed Mar. 3, 2000, 7 pages.
Notice of Allowance for U.S. Appl. No. 08/992,759 mailed Jul. 5, 2000, 5 pages.
Final Office Action for U.S. Appl. No. 10/767,016 mailed Dec. 3, 2008, 8 pages.
Non-Final Office Action for U.S. Appl. No. 10/767,016 mailed Feb. 25, 2009, 8 pages.
Non-Final Office Action for U.S. Appl. No. 10/767,016 mailed Jan. 14, 2008, 9 pages.
Notice of Allowance for U.S. Appl. No. 10/767,016 mailed Apr. 16, 2012, 8 pages.

(56) References Cited

OTHER PUBLICATIONS

Notice of Allowance for U.S. Appl. No. 10/767,016 mailed Dec. 28, 2011, 8 pages.
Notice of Allowance for U.S. Appl. No. 10/767,016 mailed Sep. 20, 2011, 7 pages.
Notice of Allowance for U.S. Appl. No. 10/767,016 mailed May 27, 2011, 7 pages.
Notice of Allowance for U.S. Appl. No. 10/767,016 mailed Dec. 29, 2010, 6 pages.
Notice of Allowance for U.S. Appl. No. 10/767,016 mailed Aug. 6, 2010, 6 pages.
Notice of Allowance for U.S. Appl. No. 10/767,016 mailed Mar. 22, 2010, 6 pages.
Notice of Allowance for U.S. Appl. No. 10/767,016 mailed Nov. 30, 2009, 6 pages.
Notice of Allowance for U.S. Appl. No. 10/767,016 mailed Sep. 15, 2009, 6 pages.
Notice of Allowance for U.S. Appl. No. 10/767,016 mailed Sep. 25, 2007, 7 pages.
Final Office Action for U.S. Appl. No. 10/767,326 mailed Jul. 9, 2008, 8 pages.
Non-Final Office Action for U.S. Appl. No. 10/767,326 mailed Jan. 23, 2009, 8 pages.
Non-Final Office Action for U.S. Appl. No. 10/767,326 mailed Jan. 9, 2008, 8 pages.
Notice of Allowance for U.S. Appl. No. 10/767,326 mailed Dec. 16, 2010, 7 pages.
Notice of Allowance for U.S. Appl. No. 10/767,326 mailed Jul. 26, 2010, 6 pages.
Supplemental Notice of Allowance for U.S. Appl. No. 10/767,326 mailed May 20, 2010, 3 pages.
Notice of Allowance for U.S. Appl. No. 10/767,326 mailed Apr. 28, 2010, 6 pages.
Notice of Allowance for U.S. Appl. No. 10/767,326 mailed Dec. 23, 2009, 9 pages.
Notice of Allowance for U.S. Appl. No. 10/767,326 mailed Sep. 18, 2009, 6 pages.
Notice of Allowance for U.S. Appl. No. 10/767,326 mailed May 14, 2009, 8 pages.
Notice of Allowance for U.S. Appl. No. 10/767,326 mailed Oct. 30, 2007, 4 pages.
Notice of Allowance for U.S. Appl. No. 10/767,326 mailed Jul. 19, 2007, 6 pages.
Notice of Allowance for U.S. Appl. No. 10/767,326 mailed Mar. 6, 2007, 4 pages.
Notice of Allowance for U.S. Appl. No. 10/767,326 mailed Aug. 30, 2006, 6 pages.
Corrected Notice of Allowance for U.S. Appl. No. 10/767,326 mailed Apr. 28, 2006, 2 pages.
Notice of Allowance for U.S. Appl. No. 10/767,326 mailed Apr. 20, 2006, 3 pages.
Supplemental Notice of Allowance for U.S. Appl. No. 10/767,326. mailed Apr. 5, 2006, 2 pages.
Supplemental Notice of Allowance for U.S. Appl. No. 10/767,326 mailed Jan. 30, 2006, 4 pages.
Notice of Allowance for U.S. Appl. No. 12/788,716, mailed Sep. 10, 2014, 15 pages.
Non-Final Office Action for U.S. Reexamination Application No. 90/008,990 mailed Feb. 25, 2009, 14 pages.
Final Office Action for U.S. Reexamination Application No. 90/008,990 mailed Jun. 12, 2009, 16 pages.
Advisory Action for U.S. Reexamination Application No. 90/008,990 mailed Aug. 31, 2009, 4 pages.
Notice of Intent to Issue a Reexamination Certificate for U.S. Reexamination Application No. 90/008,990 mailed Feb. 3, 2010, 4 pages.
Notice of Intent to Issue a Reexamination Certificate for U.S. Reexamination Application No. 90/008,990 mailed Oct. 4, 2011, 3 pages.
Newton's Telecom Dictionary, 691 (2004), 3 pages.
Office Action for Canadian Patent Application No. 2,581,871 mailed Jan. 28, 2011, 3 pages.
Office Action for Canadian Patent Application No. 2,581,871 mailed Oct. 19, 2011, 4 pages.
Office Action for Canadian Patent Application No. 2,581,871 mailed Apr. 18, 2013, 4 pages.
International Search Report for PCT/US1999/011625 mailed Nov. 15, 1999, 2 pages.
Office Action for Japanese Patent Application No. 2007-096292 mailed May 29, 2012, 6 pages.
Decision to Grant for Japanese Patent Application No. 2007-096292 mailed Oct. 16, 2012, 9 pages.
Office Action for Japanese Patent Application No. 2009-187993 mailed Apr. 27, 2012, 4 pages.
Office Action for Japanese Patent Application No. 2009-187993 mailed Jan. 15, 2013, 4 pages.
Office Action for Japanese Patent Application No. 2010-116275 mailed Jan. 20, 2012, 4 pages.
Office Action for Japanese Patent Application No. 2010-116275 mailed May 29, 2012, 4 pages.
International Search Report for PCT/US2002/001512 mailed Jun. 13, 2002, 1 page.
International Preliminary Examination Report for PCT/US2002/001512 mailed Jan. 21, 2003, 3 pages.
European Search Report for European Patent Application No. 08161008.1 mailed Sep. 17, 2008, 7 pages.
Office Action for European Patent Application No. 08161008.1 mailed Feb. 5, 2013, 3 pages.
Office Action for European Patent Application No. 08161008.1 mailed Jul. 12, 2011, 4 pages.
Office Action for European Patent Application No. 08161008.1 mailed Jan. 27, 2010, 5 pages.
Office Action for European Patent Application No. 10181171.9 mailed Nov. 3, 2011, 5 pages.
International Search Report for PCT/US1998/012875 mailed Dec. 17, 1998, 3 pages.
Andermo et al., "Code Division Testbed, CODIT," IEEE International Conference on Universal Personal Communications, vol. 1, pp. 397-401 (Oct. 12-15, 1993).
Andermo et al., "CODIT and Third Generation Systems," $4^{th}$, IEEE International Conference on Universal Personal Communications Record, pp. 843-847 (Nov. 6-10, 1995).
Andermo et al., "CODIT, a Testbed Project Evaluating DS-CDMA for UMTS/FPLMTS," IEEE $44^{th}$ Vehicular Technology Conference, vol. 1, pp. 21-25 (Jun. 8-10, 1994).
Andermo, "Overview of CODIT Project," Proceedings of the RACE Mobile Telecommunications Summit, pp. 33-42 (Nov. 1995).
Attachment 2, *High Speed Data RLP* Lucent Technologies, Version 0.1, Jan. 16, 1997.
Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Brismark et al., "A Coherent Detection Scheme for the Uplink Channel in a CDMA System," 1994 IEEE 44th Vehicular Technology Conference, Stockholm, Sweden, vol. 2, 1997, pp. 164-181.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chin-Lin I et al., Multi-Code CDMA Wireless Personal Communications Networks, Jun. 18, 1995.
Chih-Lin I et al., Performance of Multi-Code CDMA Wireless Personal Communications Networks, Jul. 25, 1995.
Chih-Lin I et al,. Variable Spreading Gain CDMA with Adaptive Control for True Packet Switching Wireless Network, 1995, pp. 725-730.
Chung, Packet Synchronization and Identification for Incremental Redundancy Transmission in FH-CDMA Systems, 1992, IEEE, pp. 292-295.

(56) References Cited

OTHER PUBLICATIONS

Data Service Options for Wideband Spread Spectrum Systems, TIA/EIA Interim Standard. TIA/EIA/IS-707, Feb. 1998.
*Data Service Options for Wideband Spread Spectrum Systems*, TIA/EIA Interim Standard, TIA/EIA/IS-707-A. Apr. 1999.
Data Service Options for Wideband Spread Spectrum Systems: Introduction, PN-3676.1 (to be published as TIA/EIA/IS-707.1), Mar. 20, 1997 (Content Revision 1).
*Data Services Option Standard for Wideband Spread Spectrum Digital Cellular System*. TIA/EIA/IS-99. TIA/EIA Interim Standard. Jul. 1995.
*Data Services Options Standard for Wideband Spread Spectrum Systems: Packet Data Services. PN-3676.5 (to be published as TIA/EIA/IS-707.5) Ballot Version, May 30, 1997.*
Data Standard, Packet Data Section, PN-3676.5 (to be published as TIA/EIA/IS-DATA.5), Dec. 8, 1996, Version 02 (Content Revision 03).
Draft Text for "95C" Physical Layer (Revision 4), Part 1, Document #531-981-20814-95C, Part 1 on 3GPP2 website (ffp://ftp.3GPP2.org/tsgc/working/1998/1298_Maui/WG3-TG1/531-98120814-95c,%20part%201,pdf, 1998).
Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.
Ejzak, et al. *Proposal for High Speed Packet Data Service, Version 0.1*. Lucent Technologies, Jan. 16, 1997.
Elhakeem, Congestion Control in Signalling Free Hybrid ATM/CDMA Satellite Network, IEEE, 1995, pp. 783-787.
"GSM 03.64 v2,1.1 Overall description of the GPRS radio interface; Stage 2", TDoc SMG 360 /97, Meeting #22, Kristiansand, Norway, Jun. 9th-13th 1997.
Hall et al., Design and Analysis of Turbo Codes on Rayleigh Fading Channels, IEEE Journal on Selected Areas in Communications, vol. 16, No. 2, Feb. 1998, pp. 160-174.
High Data Rate (HDR) Solution, Qualcomm, Dec. 1998.
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.
Honkasalo, Harri, *High Speed Data Air Interface.* 1996.
IBE, "Networks and Remote Access. Protocols, Problems, and Solutions," DMK Publishers, p. 56 (2002).
*Introduction to cdma2000 Spread Spectrum Systems*, Release C. TIA/EIA Interim Standard, TIA/EIA/IS-2000.1-C, May 2002.
Kaiser at al., Multi-Carrier CDMA with iterative Decoding and Soft-Interference Cancellation, Proceedings of Globecom 1997, vol. 1, pp. 523-529.
Knisely, Douglas, N. Telecommunications Industry Association Subcommittee TR-45.5—*Wideband Spread Spectrum Digital Technologies Standards*, Banff, Alberta, Feb. 24, 1997 (TR45.5/97.02.24)21.
Knisely, Douglas, N. Telecommunications.Industry Association Subcommittee TR 45.5—*Wideband Spread Spectrum Digital Technologies Standards, Working Group III—Physical Layer*, Banff, Alberta. Feb. 24, 1997 (TR45.5/97.02.24)22.
Knisely, Lucent Technologies Air Interface Proposal for CDMA High Speed Data Service, Jan. 16, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed PacKet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-528.
Liu et al., Channel Access and Interference Issues in Multi-Code DS-CDMA Wireless Packet (ATM) Networks, Wireless Networks 2, pp. 173-196, 1996.
Lucas, "Synchronisation Procedure in Up and Down-Link in the CoDiT Testbed," RACE Mobile Telecommunications Workshop (May 1994).
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Melanchuk et al. *CDPD and Emerging Digital Cellular Systems*, Digest of Papers of COMPCN, Computer Society Conference 1996, Santa Clara, CA, no. CONF. 41, Feb. 25, 1996, pp. 2-8, XP000628458.
Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.
Mobile Station-Base Station Compatibility Standard for Wideband Spread Spectrum Cellular Systems, TIA/EIA Interim Standard, TIA/EIA/IS-95-A (Revision of TIA/EIA/IS-95), May 1995, pp. 1-742.
Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.
Morris, "UMTS and the RACE II CODIT Project," IEEE Colloquium on Mobile Telecommunications Towards the Year 2000. pp. 8/1-8/4 (Oct. 1994).
Motorola, Version 1.0. *Motorola High Speed Data Air Interface Proposal Cornparisions and Recommendations*. Jan. 27, 1997.
*MSC-BS Interface (A-Interface) for Public 800 MHz*. TIA/EIA-634-A. TIA/EIA Interim Standard (Revision of TIA/EIA/IS-634) Jul. 1998.
*MSC-BS Interface for Public 800 MHz*.TIA/EIA/IS-634. TIA/EIA Interim Standard, Dec. 1995.
Network Wireless Systems Offer Business Unit (NWS OBU), Feature Definition Document For Code Division Multiple Access (CDMA) Packet Mode Data Services, FDD-1444, Nov. 26, 1996.
Ott, David TR45.5, CDMA WBSS Technical Standards Meeting Summary. Feb. 24-28, 1997 Banff, Alberta.
Packet Data Service Option Standard for Wideband Spread Spectrum Systems, TIA/EIA Interim Standard, TIA/EIA/IS-657, Jul. 1996.
*Physical Layer Standard for cdma2000 Spread Spectrum Systems, Release C*. TIA/EIA Interim Standard. TIA/EIA/IS-2000.2C. May 2002.
Puteston, PPP Protocol Spoofing Control Protocol, Global Village Communication (UK) Ltd., Feb. 1996.
Reed et al., Iterative Multiuser Detection for CDMA with FEC: Near-Single-User Performance, IEEE Transactions on Communications, vol. 46. No. 12, Dec. 1998, pp. 1693-1699.
*Samsung Electronics Co., Ltd.* v. *Interdigital Communications Corporation, et al.*, First Amended Complaint, Civil Action No. 07-167, United States District Court for the District of Delaware, Sep. 14, 2007.
Salmasi et al., "On the system design aspects of code division multiple access (CMDA) applied to digital cellular and personal communications networks," IEEE VTC Gateway to the Future Technology in Motion, pp. 57-62, IEEE, May 19, 1991.
Shacham, et al., "A Selective-Repeat-ARQ Protocol for Parallel Channels and Its Resequencing Analysis," IEEE Transactions on Communications, XP000297814, 40 (4): 773-782 (Apr. 1992).
Simpson, W. (Editor), "RFC 1661—The Point-to-Point Protocol (PPP)," Network Working Group, Jul. 1994, pp. 1-35, http://www.faqs.org/rfcs/rfc1661.html.
Simpson, W. (Editor). "RFC 1662—PPP in HDLC-Like Framing." Network Working Group, Jul. 1994, pp. 1-17, http://www.faqs.org/rfcs/rfc1662.html.
Skinner et al., Performance of Reverse-Link Packet Transmission in Mobile Cellular CDMA Networks, IEEE, 2001, pp. 1019-1023.
Stage 1 Service Description for Data Services—High Speed Data Services (Version 0.10) CDG RF 38. Dec. 3, 1996.

(56) References Cited

OTHER PUBLICATIONS

*Support for 14.4 kbps Data Rate and PCS Interaction for Wideband Spread Spectrum Cellular Systems*, TSB74, Dec. 1995, TIA/EIA Telecommunications Systems Builetin.
*Tantivy Communications, Inc, v. Lucent Technologies, Inc.*, Lucent Technologies, Inc.'s Preliminary Invalidity Contentions, Civil Action No. 2:04-CV-79, United States District Court for the Eastern District of Texas, Marshall Division. Dec. 8, 2004.
*Tantivy Communications, Inc. v. Lucent Technologies, Inc.*, Markman Order, Civil Action No. 2:04-CV-79, (Aug. 11, 2005).
*Tantivy Communications, Inc, v. Lucent Technologies, Inc.*, Plaintiff's Second Amended Complaint, Civil Action No. 2:04-CV-79, United States District Court for the Eastern District of Texas, Marshall Division, Jun. 3, 2005.
*Telecommunications Industry Association Meeting Summary*. Task Group I, Working Group III, Subcommittee TR45.5. Feb. 24-27, 1997. Banff, Alberta.
*Telecommunications Industry Association Meeting Summary*. Task Group I, Working Group III, Subcommittee TR45.5. Jan. 6-8, 1997. Newport Beach, California.
3rd Generation Partnership Project; Technical Specification Group Radio Access Network; MAC protocol specification (3GPP TS 25.321 version 3.6.0 Release 1999).
3rd Generation Partnership Project; Technical Specification Group Radio Access Network; Multiplexing and channel coding (FDD) (3GPP TS 25.212 version 3.5.0 Release 1999).
3rd Generation Partnership Project; Technical Specification Group Radio Access Network; Physical channels and mapping of transport channels onto physical channels (FDD) (3GPP TS 25.211 verison 3.5.0 Release 1999).
3rd Generation Partnership Project; Technical Specification Group Radio Access Network; Spreading and modulation (FDD) (3GPP TS 25.213 verison 3.4.0 Release 1999).
3rd Generation Partnership Project; Technical Specification Group Radio Access Network; UTRAN lub Interface User Plane Protocols for Common Transport Channel Data Streams (3GPP TS 25.435 version 3.5.0 Release 1990).
3rd Generation Partnership Project; Technical Specification Group Radio Access Network; Radio Interface Protocol Architecture (3GPP TS 25.301 version 3.6.0 Release 1999).
3rd Generation Partnership Project; Technical Specification Group Services and System Aspects, QoS Concept and Architecture (3GPP TS 23.107 version 3.5.0 Release 1999).
*Upper Layer (Layer 3) Signaling Standard for cdma2000 Spread Spectrum Systems, Release C*. TIA/EIA Interim Standard, TIA/EIA/IS-2000.5-C, May 2002.
Viterbi, "A Constructive (Backward Compatible) Approach for Migration to Wider Band Wireless Services," Qualcomm Incorporated, $3^{rd}$ Generation Wider Band CDMA Technology Conference (Feb. 25, 1998).
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DS-CDMA, IEEE Global Communications Conference, Phoenix, Arizona, USA, Nov. 3-8, 1997, Gol. III, pp. 1548-1551.
www.cdg.org/news/press/1997.asp, CDA Press Release Archive, 1997.

\* cited by examiner

DYNAMIC BANDWIDTH ALLOCATION FOR MULTIPLE ACCESS COMMUNICATIONS USING BUFFER URGENCY FACTOR

CROSS REFERENCE TO RELATED APPLICATIONS

This application is a continuation of Ser. No. 10/767,016 filed on Jan. 29, 2004 now U.S. Pat. No. 8,259,687, which is a continuation of Ser. No. 10/345,810 filed on Jan. 16, 2003, now abandoned, which is a continuation of Ser. No. 09/773,252 filed on Jan. 31, 2001, which issued on Apr. 1, 2003 as U.S. Pat. No. 6,542,481, which is a continuation-in-part of Ser. No. 09/088,527 filed on Jun. 1, 1998, which issued on May 14, 2002 as U.S. Pat. No. 6,388,999, wherein the entire contents of U.S. Pat. Nos. 6,542,481 and 6,388,999 identified above are incorporated herein by reference.

FIELD OF INVENTION

The present field relates to the filed of communications, and in particular, to a wireless communication system.

BACKGROUND

The increasing use of wireless telephones and personal computers has led to a corresponding demand for advanced telecommunication services that were once thought to only be meant for use in specialized applications. In the 1980's, wireless voice communication became widely available through the cellular telephone network. Such services were at first typically considered to be the exclusive province of the business person because of expected high subscriber costs. The same was also true for access to remotely distributed computer networks, whereby until very recently, only business people and large institutions could afford the necessary computers and wireline access equipment.

As a result of the widespread availability both technologies, the general population now increasingly wishes to not only have access to network such as the Internet and private intranets, but also access such networks in a wireless fashion as well. This is particularly of concern for the users of portable computers, laptop computers, hand-held personal digital assistants (PDAs) and the like who would prefer to access such networks without being tethered to a telephone line.

There still is no widely available satisfactory approach for providing low cost, high speed access to the Internet, private intranets, and other networks using the existing wireless infrastructure. This situation is most likely an artifact of several unfortunate circumstances. For one, the typical manner of providing high speed data service in the business environment over the wireline network is not readily adaptable to the voice grade service available in most homes or offices. Such standard high speed data services also do not lend themselves well to efficient transmission over standard cellular wireless handsets.

Furthermore, the existing cellular network was originally designed to deliver voice services. As result, the emphasis in present day digital wireless communication schemes lies with voice, although certain schemes such as CDMA do provide some measure of asymmetrical behavior for the accommodation of data transmission. For example, the data rate on an IS-95 forward traffic channel can be adjusted in increments from 1.2 kilobits per second (kbps) up to 9.6 kbps for so-called Rate Set 1, and in increments from 1.8 kbps up to 14.4 kbps for Rate Set 2. On the reverse link traffic channel, however, the data rate is fixed at 4.8 kbps.

The design of such existing systems therefore typically provides a radio channel which can accommodate maximum data rates only in the range of 14.4 kilobits per second (kbps) at best in the forward direction. Such a low data rate channel does not lend itself directly to transmitting data at rates of 28 or even 56.6 kbps that are now commonly available us inexpensive wire line modems, not to mention even higher rates such as the 128 kbps which are available with Integrated Services Digital Network (ISDN) type equipment. Data rates at these levels are rapidly becoming the minimum acceptable rates for activities such as browsing web pages. Other types of data networks using higher speed building blocks such as Digital Subscriber Line (xDSL) service are just now coming into use in the United States. However, their costs have only been recently reduced to the point where they are attractive to the residential customer.

Although such networks were known at the time that cellular systems were originally deployed, for the most part, there is no provision for providing higher speed ISDN- or xDSL-grade data services over cellular network topologies. Unfortunately, in wireless environments, access to channels by multiple subscribers is expensive and there is competition for them. Whether the multiple access is provided by the traditional Frequency Division Multiple Access (FDMA) using analog modulation on a group of radio carriers, or by newer digital modulation schemes the permit sharing of a radio carrier using Time Division Multiple Access (TDMA) or Code Division Multiple Access (CDMA), the nature of the radio spectrum is that it is a medium that is expected to be shared. This is quite dissimilar to the traditional environment for data transmission, in which the wireline medium is relatively inexpensive to obtain, and is therefore not typically intended to be shared.

Other considerations are the characteristics of the data itself. For example, consider that access to web pages in general is burst-oriented, with asymmetrical data rate transmission requirements. In particular, the user of a remote client computer first specifies the address of a web page to a browser program. The browser program then sends this web page address data, which is typically 100 bytes or less in length, over the network to a server computer. The server computer then responds with the content of the requested webpage, which may include anywhere from 10 kilobytes to several megabytes of text, image, audio, or even video data. The user then may spend at least several seconds or even several minutes reading the content of the page before requesting that another page be downloaded. Therefore, the required forward channel data rates, that is, from the base station to the subscriber, are typically many times greater than the required reverse channel data rates.

In an office environment, the nature of most employees' computer work habits is typically to check few web pages and then to do something else for extended period of time, such as accessing locally stored date or to even stop using the computer altogether. Therefore, even though such users may expect to remain connected to the Internet or private intranet continuously during an entire day, the actual overall nature of the need to support a required data transfer activity to and from a particular subscriber unit is actually quite sporadic.

Furthermore, prior art wireless communication systems provide a continuous bandwidth to individual subscribers. That is, in such networks, during a communication session the bandwidth available at all times is constant and has been designed, as noted above, primarily for voice grade use.

SUMMARY OF THE INVENTION

In view of the foregoing background, an object of the present invention is to more efficiently transmit digital signals in a wireless digital communication system.

This and other objects, advantages and features in accordance with the present invention are provided by a base station providing wireless communication of digital signals, with the digital signals being communicated in frames using a radio frequency channel via Code Division Multiple Access (CDMA) modulated radio signals.

The base station may include a wireless transceiver for establishing communication sessions over the plurality of digital communication paths, a bandwidth management module connected to the wireless transceiver for allocating a code channel within the radio frequency channel for the digital communication path to exchange digital signals during the communication session, and a plurality of buffers for storing data to be transmitted by the wireless transceiver. Each buffer may be associated with a particular digital communication path and may have at least one threshold associated with a level of data stored therein.

A transmission processor may allocate a plurality of code channels within the at least one radio frequency channel to transmit the stored data during the communication sessions. A channel resource assignor may be connected to the transmission processor for monitoring a level of data stored in each buffer and for computing an urgency factor for each buffer based upon the at least one threshold associated therewith. The urgency factor may represent a relative need for transmitting the stored data over the particular digital communication path associated with that buffer. The channel resource assignor may compare the computed urgency factor for the plurality of buffers for determining how many code channels are to be allocated to each digital communication path.

The present invention advantageously provides high speed data and voice service over standard wireless connections via a unique integration of protocols and existing cellular signaling, such as is available with Code Division Multiple Access (CDMA) type systems. The invention achieves high data rates through more efficient allocation of access to the CDMA channels.

The at least one threshold associated with each buffer may comprise a plurality of thresholds. The computed urgency factors may represent how full the plurality of buffers are. The computed urgency factor for each buffer may also be based upon a number of code channels currently allocated to the particular digital communication path associated therewith.

The computed urgency factor for each buffer is also based upon how much time has passed since stored data has been transmitted therefrom. The computed urgency factor for each buffer may also be based upon a quality of service of the communication sessions. The quality of service may be based upon at least one of throughput, data rate, latency and jitter.

The digital signals may comprise at least one of voice and data signals. The wireless communication of digital signals may be performed with a plurality of subscriber units over the plurality of digital communication paths. The at least one radio frequency channel may comprise a first and second radio frequency channels. The first radio frequency channel establishes forward code channels between the wireless transceiver and the plurality of subscriber units, with the stored data from the plurality of buffers being transmitted by the wireless transceiver on the forward code channels. The second radio frequency channel establishes reverse code channels between the plurality of subscriber units and the wireless transceiver.

Each subscriber unit may comprise a buffer for storing data to be transmitted to the wireless transceiver, and has at least one threshold associated with a level of data stored therein. Each subscriber unit may transmit to the wireless transceiver on a reverse code channel the level of data stored in its buffer with respect to the threshold associated therewith. The channel resource assignor also computes an urgency factor for each subscriber unit.

The forward and reverse code channels may be multiplexed on a single radio frequency channel. Alternatively, the forward and reverse code channels may be on different radio frequency channels.

Another aspect of the present invention is directed to a subscriber unit for providing wireless communication of digital signals between terminal equipment connected therewith and a digital communication path, with the digital signals being communicated using at least one radio frequency channel via Code Division Multiple Access (CDMA) modulated radio signals.

The subscriber unit may comprise a wireless transceiver transmission processor for receiving over the digital communication path at least one allocated code channel within the at least one radio frequency channel to transmit the data stored in the buffer during the respective communication session.

The wireless transceiver may transmit a lever of data stored in the buffer with respect to the at least one threshold associated therewith. The transmission processor may receive over the digital communication path an adjustment in a number of at least one allocated code channel within the at least one radio frequency channel received based upon an urgency factor. The urgency factor may be computed for representing a relative need for transmitting the data stored in the buffer over the digital communication path.

Yet another aspect of the present invention is directed to a digital communication system comprising a plurality of subscriber units as defined above for providing wireless communication of digital signals, and a base station as defined above for establishing communication sessions with the plurality of subscriber units over a plurality of digital communication paths.

Prior art methodologies for transmission of data over wireless networks this suffer numerous problems. As noted above, the bandwidth available for a single subscriber unit channel is typically fixed in size. However, data communications tend to be bursty in nature, often requiring a need for large amounts of bandwidth at certain times, while requiring very little amounts, or even none, at other times. These wide swings in bandwidth requirements can be very close together in time.

For example, when browsing a web site using HyperText Transfer Protocol (HTTP), the user typically selects pages by selecting or clicking a single link to a page causing the client computer to send a small page request packet to the web server. The request packet in the receive link direction requires very little bandwidth. In response to the request, the server typically delivers one or more web pages ranging in size from 10 to 100 kilobits (kB) or more to the client in the forward link direction. To receive the pages, the bandwidth requirements are much greater than to request the pages. The optimum bandwidth needed to acceptably receive the pages is rarely realized due to the inefficiency of the present wireless protocols that only offer maximum data rates of about 9600 bps under optimal conditions. This results in the server having to hold back some of the requested data until the network can "catch up" with the data delivery and also results in frustrated users having slow response and page loading times. In essence, the bandwidth to send a request is more than is needed, and the bandwidth to receive the pages is not enough to deliver the data at acceptable rates.

Another problem with prior art systems is that the difference between the time which the page request message leaves the wireless network and becomes wirebound, and the time when the pages of requested data enter the wireless portion of the data communications session is often quite long. This time-from-request to time-of-receipt delay is a function of how congested the network and the server are.

The present invention is based in part on the observation that bandwidth is being wasted during periods of time when waiting for data from the wireline network. Prior art wireless communications systems maintain the constant availability of the full bandwidth of the 9600 bps wireless connection for that entire data communication session, even though the wireless client may be waiting for return pages. This bandwidth which is effectively unused is therefore wasted because there is no way to allocate the channel resources in use for this data communication session to another session needing more bandwidth. That is, if other concurrent wireless data communications sessions are taking place for other subscriber units, these concurrent sessions have no way in the prior art systems to take advantage of any unused bandwidth allocated to the client merely waiting for return pages, as in this example.

The present invention provides high speed data and voice service over standard wireless connections via an unique integration of protocols and existing cellular signaling, such as is available with Code Division Multiple Access (CDMA) type systems. The invention achieves high data rates through more efficient allocation of access to the CDMA channels.

Specifically, the invention provides a scheme for determining an efficient allocation of N fixed rate data channels amongst M users. The invention addresses the problem of how to allocate these channels in the most effective manner between users competing for channel use. For example, when more users exist than channels, the invention determines a set of probabilities for which users will require channel access at which times, and assigns channel resources accordingly. The invention can also dynamically take away or deallocate channels (i.e., bandwidth) from idle subscribers and provide or allocate these freed-up channels to subscribers requiring this bandwidth.

Channel resources are allocated according to a buffer monitoring scheme provided on forward and reverse links between a base station and multiple subscriber units. Data buffers are maintained for each connection between a base station and a subscriber unit. Each buffer is monitored over time for threshold levels of data to be transmitted in that buffer. In essence, the thresholds measure the "fullness" of buffers over time for each respective subscriber unit are monitored. For each buffer, a probability is calculated that indicates how often that a specific buffer for a specific subscriber will need to transmit data and how much data will be transmitted. This probability takes into account the arrival rates of data into the buffer, as well as which thresholds within the buffer are exceeded, as well as which resources in the form of channels are already allocated to the subscriber unit. Based on this probability, channel resources for data transmission can be either allocated or deallocated to subscriber units depending upon a forecasted need.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE PREFERRED EMBODIMENTS

Referring to FIGS. 1-4, these figures describe a dynamic bandwidth allocation process for multiple access communications using a buffer urgency factor.

Figure 1:
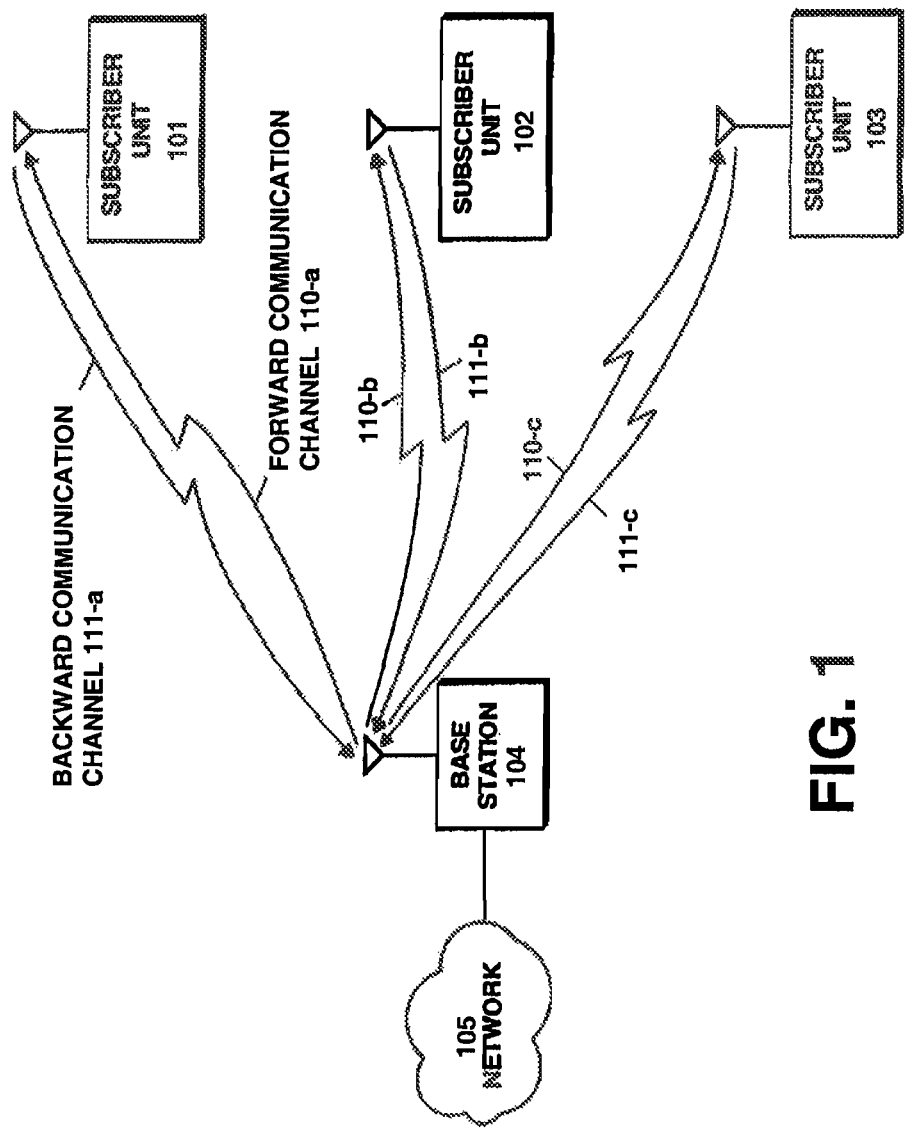
FIG. 1 is a block diagram of an example wireless communication system making use of a bandwidth management scheme according to the invention.

Turning attention now to the drawings, FIG. 1 is a block diagram of a system 100 for providing high speed data service over a wireless connection by seamlessly integrating a digital data protocol such as, for example, Integrated Services Digital Network (ISDN) with a digitally modulated wireless service such as Code Division Multiple Access (CDMA).

The system 100 comprises two different types of components, including subscriber units 101, 102, and 103 (collectively subscribers 101) as well as one of more base stations 104 to provide the functions necessary in order to achieve the desired implementation of the invention. The subscriber units 101 provide wireless data and/or voice services and can connect devices such as, for example, laptop computers, portable computers, personal digital assistants (PDAs) or the like through base station 104 to a network 105 which can be a Public Switched Telephone Network (PSTN), a packet switched computer network, or other data network such as the Internet or a private intranet.

The base station 104 may communicate with the network 105 over any number of different efficient communication protocols such as primary rate ISDN, or other LAPD based protocols such as IS-634 or V5.2, or even TCP/IP if network 105 is an Ethernet network such as the Internet. The subscriber units 101 may be mobile in nature and may travel from one location to another while communicating with the base station 104.

FIG. 1 illustrates one base station 104 and three mobile subscriber units 101 by way of example only and for ease of description of the invention. The invention is applicable to systems in which there are typically many more subscriber units communicating with one or more base stations.

It is also to be understood by those skilled in the art that FIG. 1 may be a standard cellular type communication system such as a CDMA, TDMA, GSM or other system in which the radio channels are assigned to carry between the base stations 104 and subscriber units 101. This invention, however, applies more particularly to non-voice transmissions, and preferably to digital data transmissions of varying bandwidths. Thus, in a preferred embodiment, FIG. 1 is a CDMA-like system, using code division multiplexing principles for the air interface. However, it is also to be understood that the invention is not limited to using standardized CDMA protocols such as IS-95B. The invention is also applicable to other multiple access techniques.

In order to provide data and voice communications between the subscriber units 101 and base station 104, wireless transmission of data over a limited number of radio channel resources is provided via forward communication channels 110-a through 110-c, and reverse communication channels 111-a through 111-c. The invention provides dynamic bandwidth management of these limited channel resources on an as needed basis for each subscriber unit 101. It should also be understood that data signals travel bidirectionally across the CDMA radio channels 110 and 111 i.e., data signals originating at the subscriber units 101 are coupled to the network 105, and data signals received from the network 105 are coupled to the subscriber units 101.

Figure 2:
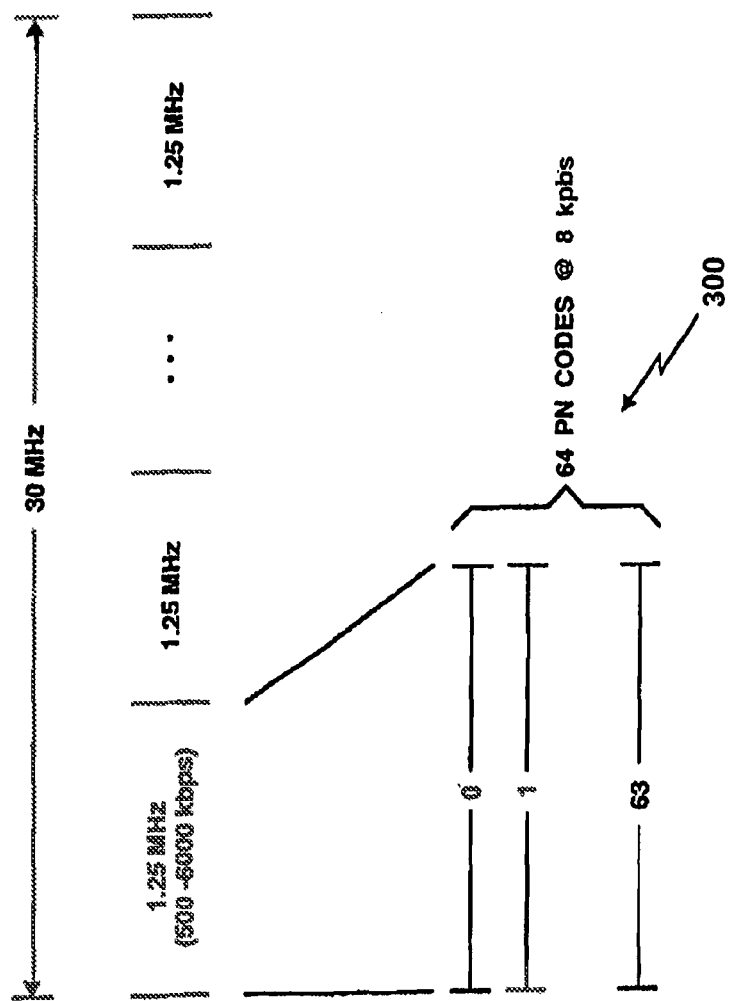
FIG. 2 is a diagram showing how channels are assigned within a given radio frequency (RF) channel.

FIG. 2 provides an example of how dynamic allocation of radio bandwidth may take place in an example system 101. First a typical transceiver within a subscriber unit 101 or the base station 104 can be tuned on command to any 1.25 MegaHertz (MHZ) channel within a much larger bandwidth, such as up to 30 MHZ in the case of the radio spectrum allocated to cellular Telephony. This bandwidth is typically made available in the range of from 800 to 900 MHZ in the United States. For PCS type wireless systems, a 5 or 10 MHZ bandwidth is typically allocated in the range from about 1.8 to 2.0 GigaHertz (GHz). In addition, there are typically two matching band active simultaneously, separated by a guard band, such as 80 MHZ. The two matching bands form a forward and reverse full duplex link between the base station 104 and the subscriber units 101.

For example, within the subscriber unit 101 and the base station 104, transmission processors (i.e., transceivers) are capable of being tuned at any given point in time to a given 1.25 MHZ radio frequency channel. It is generally understood that such 1.25 MHZ radio frequency carrier provides, at best, a total equivalent of about a 500 to 600 kbps maximum data rate transmission speed within acceptable bit error rate limitations.

In the prior art, it was thus generally understood that in order to support an ISDN type like connection which may contain information at a rate of 128 kbps that, at best, only about (500 kbps/128 kbps) or only three (3) ISDN subscriber units could be supported at best.

In contrast to this, the present invention subdivides the available approximately 500 to 600 kbps data rate among a relatively large number of channels and then provides a way to determine how to allocate these channels to best transmit data between the base station 1804 and each of the subscriber units 1801, and vice versa. In the illustrated example in FIG. 2, the bandwidth is divided into sixty-four (64) subchannels, each providing an 8 kbps data rate. It should be understood herein that within a CDMA type system, the subchannels may be defined within a single CDMA radio frequency (RF) carrier by using different orthogonal Walsh codes for each defined subchannel. The subchannels are also referred to as "channels" in the following discussion, and the two terms are used interchangeably herein.

As mentioned above, the channels are allocated only as needed. For example, multiple channels are granted during times when a particular subscriber unit 101 is requesting that large amounts of data be transferred. In this instance and in the preferred embodiment, the single subscriber unit 101 may be granted as many as 20 of these channels in order to allow data rates of up to 160 kbps (20*8 kbps) for this individual subscriber unit 101. These channels are then released lightly loaded. The invention determines the way in which the limited number of channels are divided at any moment in time among the subscriber units 101.

Figure 3:
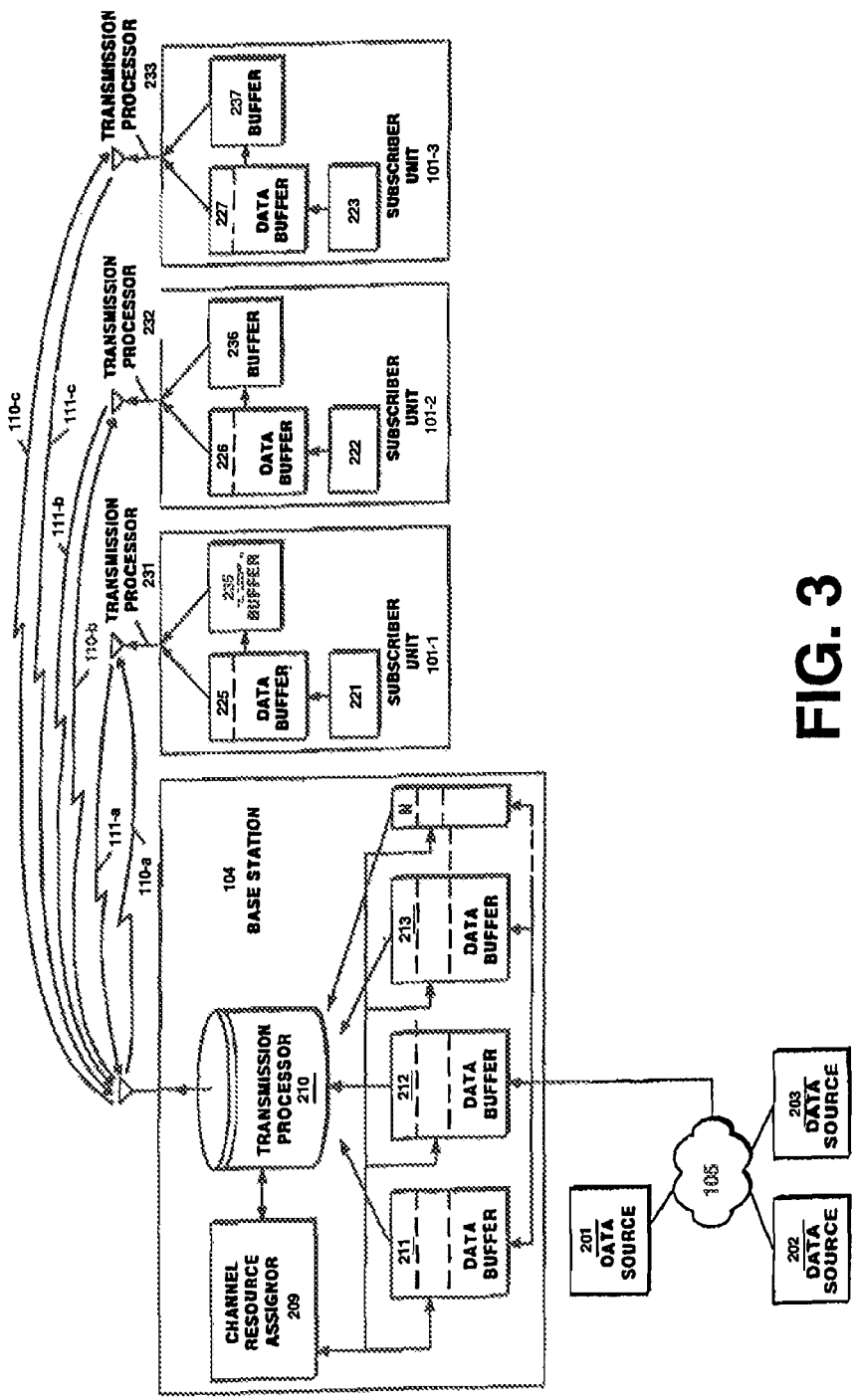
FIG. 3 is a block diagram illustrating the internal components of a base station and subscriber units that provide the dynamic bandwidth allocation mechanism.

Before discussing how the channels are preferably allocated and deallocated, it will help to understand the general architecture of relevant parts of a typical subscriber unit 101 and base station 104 in greater detail. Turning attention now to FIG. 3, the base station 104 accepts data from incoming data sources 201 through 203. Each data source 201 through 203 represents any type of data source that is sending data to one or more of the subscriber units 101. For example, data source 202 may be web server software on network 105 serving web pages to a client web browser operating in conjunction with subscriber unit 101-1, while data source 203 may be an ISDN terminal on network 105 that is sending voice and data to subscriber unit 101-3.

For each subscriber unit 101 that is in communication with this particular base station 104, the base station 104 establishes and allocates a respective data buffer 211 through 213. Data buffers 211 through 213 store the data that is to be transmitted to their respective subscriber units 101. That is, in a preferred embodiment, there is a separate data buffer in the base station 104 for each respective subscriber unit 101. As subscriber units enter into and exit out of communication sessions or connections with base station 104, the number of buffers may change. There is always a one-to-one correspondence between the number of buffers 211 through 213 allocated to the number of subscriber units 101 communicating with base station 104. The buffers 211 through 213 may be, for example, queues or other memory structures controlled by software, or may be hardware controlled fast cache memory.

As data is queued up in the buffers 211 through 213, transmission processor 210 transmits the data from the base station 104 to the respective subscriber units 101. In the case of forward link transmission (from the base station 104 to the subscriber units 101), a selection of limited number of forward link channels 110a through 110c are used. As will be explained, the invention is able to accommodate greater bandwidth for one particular subscriber unit 101, as more and more data is queued at the base station 104. That is, as the transmission processor 210 in the base station 104 accepts data from each buffer 211 through 213 for transmission to that buffers' respective subscriber unit 101, the transmission processor 210 uses only the allocated number of forward link 110 resources assigned to that particular respective subscriber unit. To determine how these channel resources are assigned, the invention provides a channel resource assignor 209 which implements a unique algorithm according to the invention that monitors buffer usage to determine an urgency characteristic of each subscriber unit 101 in order to dynamically assign an optimum number of channel resources to be allocated to each subscriber unit.

In the reverse direction, each subscriber unit 101 also contains a respective data source 221 through 223 that provides data to data buffers 225 through 227. The data stored in buffers 225 through 227 is data to be transmitted on one or more of the reverse links 111a-c back to the base station 104, for eventual transmission to processes or devices on network 105 that are connected at a network session layer with the subscriber units 101. Each subscriber unit 101 also contains a transmission processor 231 through 233 for controlling the transmission of data from buffers 225 through 227 back to base station 104. As in the base station 104, the transmission processors 231 through 233 only use an allocated number of reverse channel 111a-c resources assigned to the particular respective subscriber unit 101.

In a preferred embodiment of the invention, the channel resource assignor 2009 in the base station also monitors the usage of buffers 225 through 227 within subscriber units 101. This is accomplished via buffer monitors 235 through 237 in each subscriber unit 101 which periodically report buffer characteristics back to base station 104. The buffer characteristics reports may be piggybacked onto the regular transmission of data on the reverse links 111a-c.

Upon receipt of this buffer characteristic information, the channel resource assignor 209 then determines an urgency factor representing the relative need for each subscriber unit 101 to transmit data on the reverse links 111a-c from their respective buffers 225 through 227. Using these urgency factors, the channel resource assignor 209 can then dynamically assign an optimum number of channel resources which each subscriber unit may use on the reverse links 111a-c. This channel assignment information sent back to the subscriber units 101 on the forward links 110, so that the transmission processors 231 through 233 know their currently allocated channels at all times.

The channel resource assignor 209 is thus a bandwidth management function that includes the dynamic management of the bandwidth allocated to a particular network layer session connection. Before a further description of the channel assignor 209 is given, it should be understood that no matter what bandwidth allocation is given to a particular subscriber unit 101, a network layer communication session will be maintained even though a wireless bandwidth initially allocated for transmission is reassigned to other connections when there is no information to transmit. One manner of maintaining network layer communication sessions during periods of reduced allocation of bandwidth for a particular subscriber unit is discussed in detail in the above-referenced U.S. patents, which are assigned to the current assignee of the present invention, and the entire contents of which are hereby incorporated by reference in their entirety.

In general, bandwidth assignments are made for each network layer session based upon measured short term data rate needs as determined by buffer statistics. One or more channels are then assigned based upon these measurements and other parameters such as amount of data in the buffer, the present resources allocated to a subscriber unit to transmit data or priority of service as assigned by the service provider. In addition, when a given session is idle, a connection is preferably still maintained end to end, although with a minimum number of channel resources allocated, such as a single subchannel being assigned. This single subchannel may eventually be dropped after a predetermined minimum idle time is observed.

Figure 4:
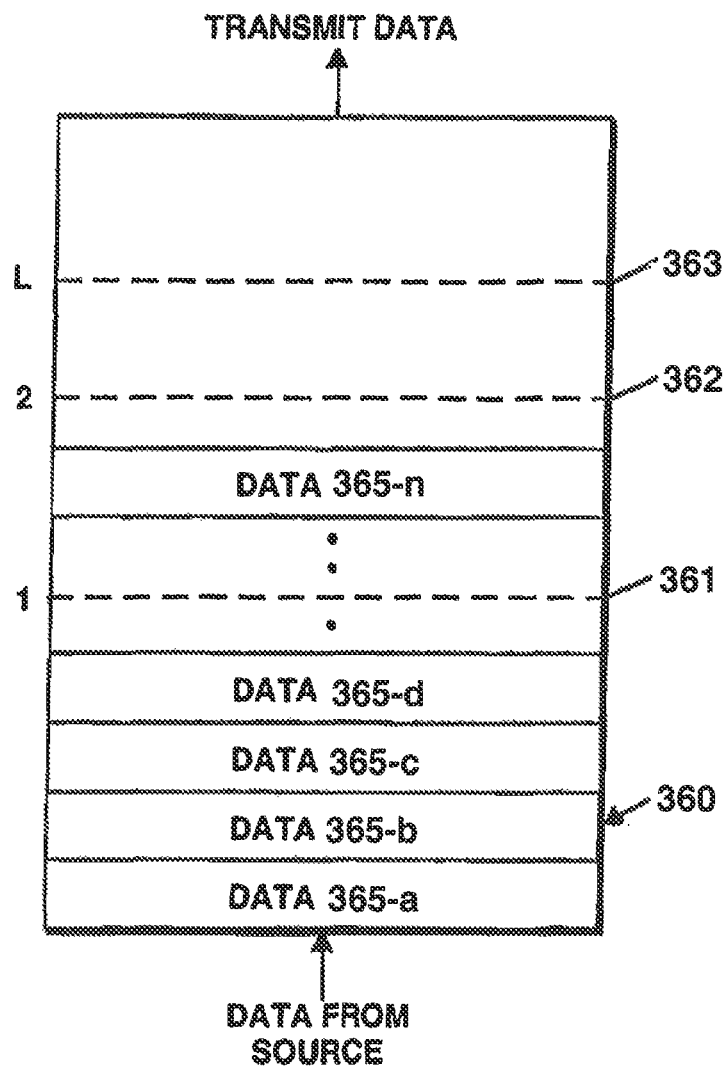
FIG. 4 illustrates the structure of the buffers used in either the base station or subscriber units.

FIG. 4 illustrates a buffer 360 in detail. Buffer 360 can be any one of the buffers 211 through 213 or 225 through 227 in either the subscriber units 101 or base station 104. The buffer 360 accepts data 365 and stores this data while awaiting transmission on forward links 110 from the base station 104 to a respective subscriber unit 101, or on reverse links 111 from one of the subscriber units to the base station 104. Each buffer has associated with it L thresholds, which in this example are labeled 1, 2, . . . L and numbered 361, 362, and 363 respectively. These L thresholds are an indication of how much data is currently stored in the buffer 360. That is, the thresholds are "characteristics" in the sense that they provide an indication of how much buffer memory is currently in use.

As data 365 enters and fills buffer 360, until transmission of this data takes place, the data may fill buffer 360 so much so as to cross certain of the thresholds 361 through 363. For instance, in FIG. 4, data blocks 365-a through 365-d have filled buffer 360 enough to approach the first threshold 361.

The last block of data 365-n exists between thresholds 361 and 362 and so the buffer 360 has stored data in an amount exceeding the first threshold 361. In other words, buffer 360 as shown has a threshold level of "1", corresponding to the first threshold 361.

As explained above, the channel resource assignor 209 in base station 104 obtains an indication of the threshold level for each buffer 225 through 227 in each respective subscriber unit 101 through 103. By determining how much data is in each buffer, the resulting data arrival rates of data to each buffer, and the resources currently allocated to transmit data from a buffer, an urgency factor for each data source attempting to transmit on the reverse links 111 is computed. A similar computation takes place for each data transmitter on the forward links 110.

More particularly, an urgency factor is calculated for each buffer based on these buffer characteristics, that indicates the relative need to empty the buffer for that particular receiver as compared to the buffers in other receivers. Given urgency factors for each buffer having data queued for transmission to a waiting receiver, the invention is able to determine how to allocate the available channels to best transmit this data.

The urgency factor for buffer 360, for example, is based on statistical information gathered for the accumulation of data 365. The statistical information is used to compute probabilities of when data 365 exceeds or does not exceed certain of the L discrete data thresholds 361, 362, and 363. Thus, as data 365 enters buffer 360 and exceeds the first threshold 361, the urgency factor for that buffer, and hence for the receiver associated with that buffer (i.e., for example, one of the subscriber units 101 for which data 365 in buffer 360 is destined) increases.

The urgency factor for buffer 360 is also based upon conditional probabilities of how much time has passed since buffer 360 has had data 365 transmitted from the buffer to its intended receiver, as well as how much time has passed since data 365 has been received at the buffer 360 for storage until transmission may occur. The urgency factor depends partly on the history of the time that the data level in the buffer exists between each threshold in the buffer and on the number of times each threshold, including the maximum buffer capacity, is exceeded.

The urgency factor is based on how close data 365 is to the last threshold L 363, which indicates that the buffer is reaching maximum capacity. The urgency factor therefore also accounts for the probability of exceeding the capacity of buffer 360, based on exceeding the maximum threshold L 363.

The channel resource allocator 209 therefore calculates an urgency factor, U, for each of M buffers, where M is the total number of buffers used in the reverse 111 and forward 110 links. The urgency factor for the buffers are servicing the forward links 110 are calculated independently of urgency factors for the other buffers servicing the reverse links 111, and the buffers servicing each transmission direction of a particular connection between a particular one of the subscriber units 101 and the base station 104 are independent of one another.

At any given time, a given buffer J has a number of channels, $N_J$, which is the number of channels already allocated to that particular buffer J. Accordingly, $N_J$ must range from $1 < N_J < N_{MAX}$, where $N_{MAX}$ is the maximum number of channel resources that may be assigned to any one particular buffer, and hence to any one link. In the preferred embodiment, $N_{MAX}$ can be as high as 20 channels, with each channel operating at approximately 8.55 kilobits per second (kbps) or at 13.3 kbps, depending upon a rate selection as determined by which CDMA standard is used. Thus, if a particular buffer is assigned the maximum number of channels to accommodate data transfers for high bandwidth applications, instantaneous data rates may be achieved as high as from about 171 kbps to 260 kbps.

The urgency factor U for a given buffer is equal to the sum of weighted conditional probabilities. Each conditional probability represents the chance of exceeding the last threshold L, within a time frame, $T_S$, given that the data in the buffer has already exceeded a particular threshold $E_i$. The time frame $T_S$ corresponds to the maximum time needed to reallocate a resource. The probabilities for an urgency factor U for a single buffer are all computed in a similar manner, but are based upon different thresholds within that buffer. Thus, as the probabilities for each threshold change with the various demands for service, the urgency factor for that particular buffer also changes.

In a preferred embodiment, the probability of exceeding a particular threshold $E_L$ in time $T_S$ given that another threshold $E_i$ is exceeded is given by:

$$P_{EL}(T_S \mid E_i) = \frac{P_{EL}(E_i) \cdot P_{EL}(T_S)}{P_{EL}(E_j)}$$

Threshold $E_i$ is used in the above equation when computing the probability of exceeding a threshold $E_L$, in a time period $T_S$, given that the data level in the buffer has already crossed threshold $E_j$. Since this is an indirect computation, it may be derived from the formula:

$$\frac{\sum (P_{EL} \text{ within } T_S \text{ of } E_i) / \sum (E_i \text{ for } T_S)}{\sum (E_L / E_i)}$$

The probabilities that make up the urgency factor U for a particular buffer are also weighted before they are summed, such as $$U = \Sigma_i P_E^L(T_S | E_i) \cdot W_i(N)$$

The weight $W_i(N)$ for each probability is selected to optimize the resource allocation. For example, the weight is selected based upon which threshold is crossed and therefore affects the urgency factor for that buffer by increasing the weight of the summed probabilities used to compute that urgency factor for that buffer.

Once an urgency factor U for each buffer has been computed, the channel resource assignor 2009 determines how to allocate the available channels among the buffers. This is accomplished in a preferred embodiment by determining which buffer has the highest urgency factor and which one has the lowest. Next, the highest and lowest urgency factors must exceed respective high and low urgency thresholds. If this is true, one resource channel is deallocated from the buffer with the lowest urgency factor and is reallocated to the buffer with the highest urgency factor. In this manner, the channel resources for buffers may change over time based upon the urgency factors of the buffers.

Also, when $N_J$ is 1, there is only one channel allocated to a particular buffer. In this state, the assigned channel resource may be reallocated (i.e., taken away) to another buffer if there is no data in buffer and if the probability of exceeding the buffer capacity within the time it takes to reassign this initial resource, $P_{E^L}(T_S|E_0)$, is less than the probability of reaching the buffer overflow limit $P(E_L)$, which is a predetermined constant.

Referring to FIGS. 5-11, these figures describe a dynamic bandwidth allocation process for multiple access communications using session queues.

Figure 5:
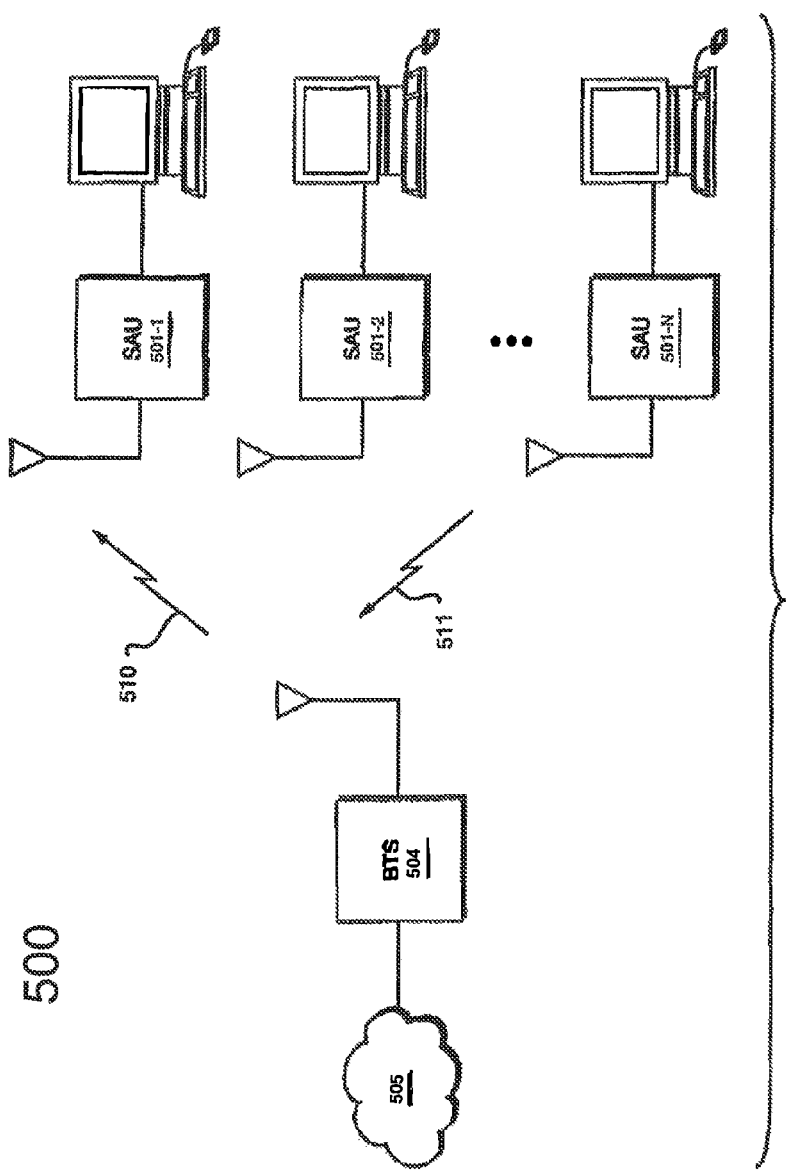
FIG. 5 is a block diagram of an example wireless communication system making use of a bandwidth management scheme according to the invention.

More specifically, FIG. 5 is a block diagram of a system 500 for providing high speed data service over a wireless connection by seamlessly integrating a wired digital data protocol such as, for example, Transmission Control Protocol/Internet Protocol (TCP/IP) with a digitally modulated wireless service such as Code Division Multiple Access (CDMA).

The system 500 consists of two different types of components, including subscriber units 501-1, 501-2, . . . , 501-n (collectively subscribers 501) as well as one or more base stations 504 to provide the functions necessary in order to achieve the desired implementation of the invention. The subscriber units 501 provide wireless data and/or voice services and can connect devices such as, for example, laptop computers, portable computers, personal digital assistants (PDAs) or the like through base station 504 to a network 505 which can be a Public Switched Telephone Network (PSTN), a packet switched computer network, or other data network such as the Internet or a private intranet. The base station 504 may communicate with the network 505 over any number of different efficient communication protocols such as primary rate ISDN, or other LAPD based protocols such as IS-634 or V5.2, or even TCP/IP if network 505 is an Ethernet network such as the Internet. The subscriber units 501 may be mobile in nature and may travel from one location to another while communicating with base station 504.

FIG. 5 illustrates one base station 504 and three mobile subscriber units 501 by way of example only and for ease of description of the invention. The invention is applicable to systems in which there are typically many more subscriber units 501 communicating with one or more base stations 504.

It is also to be understood by those skilled in the art that FIG. 5 may be a standard cellular type communication system such as a CDMA, TDMA, GSM or other system in which the radio channels are assigned to carry between the base stations 504 and subscriber units 501. This invention, however, applies more particularly to non-voice transmissions, and preferably to digital data transmissions of varying bandwidths. Thus, in a preferred embodiment, FIG. 5 is a CDMA-like system, using code division multiplexing principles for the air interface. However, it is also to be understood that the invention is not limited to using standardized CDMA protocols such as IS-95, or the newer emerging CDMA protocol referred to as IS-95B. The invention is also applicable to other multiple access techniques.

In order to provide data and voice communications between the subscriber units 501 and base station 504, wireless transmission of data over a limited number of radio channel resources is provided via forward communication channels 510 which carry information from the base station 504 to the subscriber units 501, and reverse communication channels 511 which carry information from the subscriber units 501 to the base station 504. The invention provides dynamic bandwidth management of these limited channel resources on an as needed basis for each subscriber unit 501. It should also be understood that data signals travel bidirectionally across the CDMA radio channels 510 and 511, i.e., data signals originating at the subscriber units 501 are coupled to the network 505, and data signals received from the network 505 are coupled to the subscriber units 501.

Figure 6:
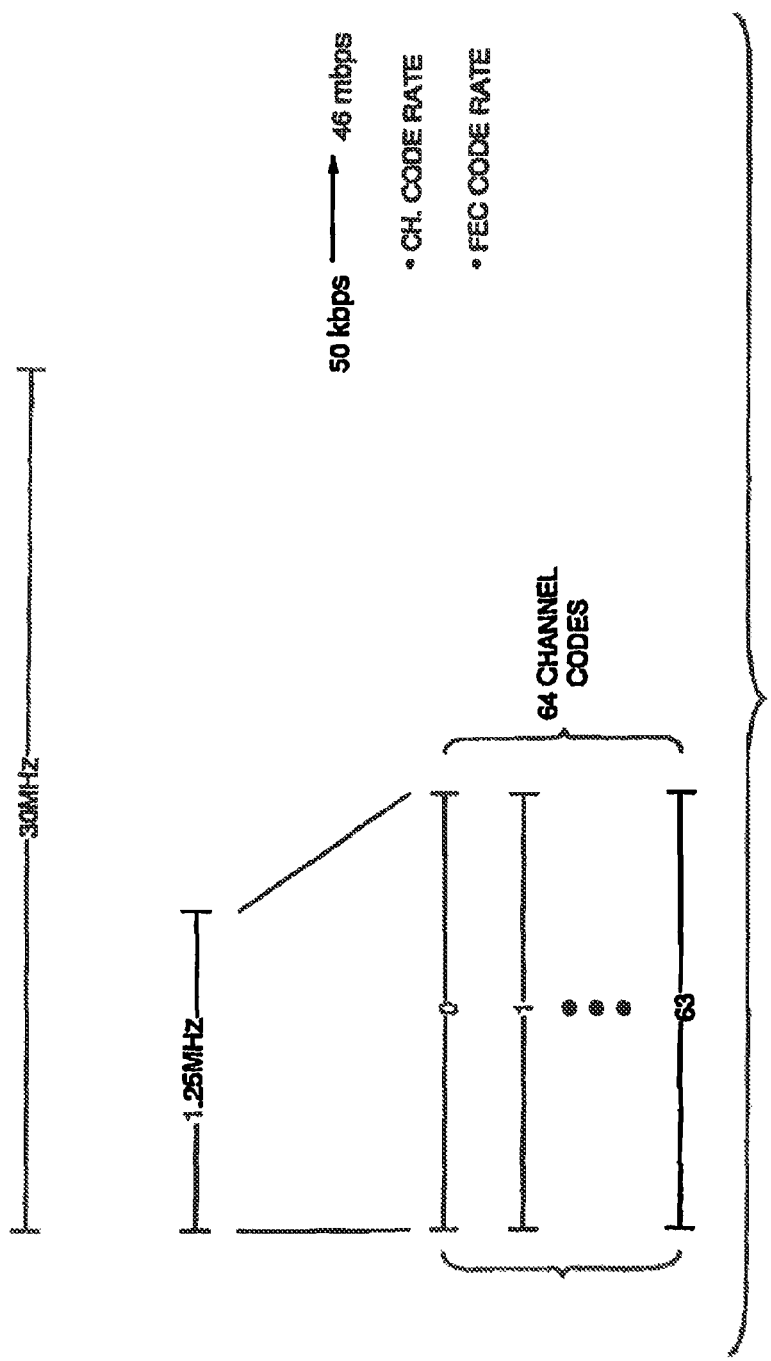
FIG. 6 is a diagram showing how channels are assigned within a given radio frequency (RF) channel.

FIG. 6 provides an example of how dynamic allocation of radio bandwidth may take place in system 500. First, a typical transceiver within a subscriber unit 501 or the base station 504 can be tuned on command to any 1.25 MegaHertz (MHz)

channel within a much larger bandwidth, such as up to 30 MHz in the case of the radio spectrum allocated to cellular telephony. This bandwidth is typically made available in the range of from 800 to 900 MHz in the United States. For PCS type wireless systems, a 5 or 10 MHz bandwidth is typically allocated in the range from about 1.8 to 2.0 GigaHertz (GHz). In addition, there are typically two matching bands active simultaneously, separated by a guard band, such as 80 MHz; the two matching bands form a forward and reverse full duplex link between the base station 504 and the subscriber units 501.

Within the subscriber unit 501 and the base station 504 transmission processors (i.e., transceivers) are capable of being tuned at any given point in time to a given 1.25 MHz radio frequency channel. It is generally understood that such 1.25 MHz radio frequency carrier provides, at best, a total equivalent of about a 500 to 600 kbps maximum data rate transmission speed within acceptable bit error rate limitations. In the prior art, it was thus generally thought that in order to support an XDSL type connection which may contain information at a rate of 128 kbps that, at best, only about (500 kbps/128 kbps) or only three (3) subscriber units 501 could be supported at best on each radio channel.

In contrast to this, the present system 500 subdivides the available radio channel resources into a relatively large number of subchannels and then provides a way to determine how to allocate these subchannels to best transmit data between the base station 504 and each of the subscriber units 501 and vice versa. In the illustrated example in FIG. 6, the bandwidth is allocated to sixty-four (64) subchannels. It should be understood herein that within a CDMA type system, the subchannels are physically implemented by encoding a data transmission with one of a number of different pseudorandom (PN) or orthogonal channel codes. For example, the subchannels may be defined within a single CDMA radio frequency (RF) carrier by using different orthogonal codes for each defined subchannel. (The subchannels are also referred to as "channels" in the following discussion, and the two terms are used interchangeably from this part onward).

As mentioned above, the channels are allocated only as needed. For example, multiple channels are granted during times when a particular subscriber unit 501 is requesting that large amounts of data be transferred. In the preferred embodiment, the single subscriber unit 501 may be granted as many as 28 of these channels in order to allow data rates of up to about 5 Mega bits per second for an individual subscriber unit 501. These channels are then released during times when the subscriber unit 501 is relatively lightly loaded.

Maximum flexibility can be obtained by adjusting coding rates and modulation types used for each connection, such as the number of channels. One particular scheme for assigning channel codes, Forward Error Correction (FEC) code rate, and symbol modulation types is described in a co-pending U.S. patent application Ser. No. 09/773,253 filed Jan. 31, 2001 entitled "Maximizing Data Rate by Adjusting Code and Coding Rates in CDMA System", which is assigned to Tantivy Communications, Inc., the same assignee of the present application, which is also hereby incorporated by reference.

Figure 8:
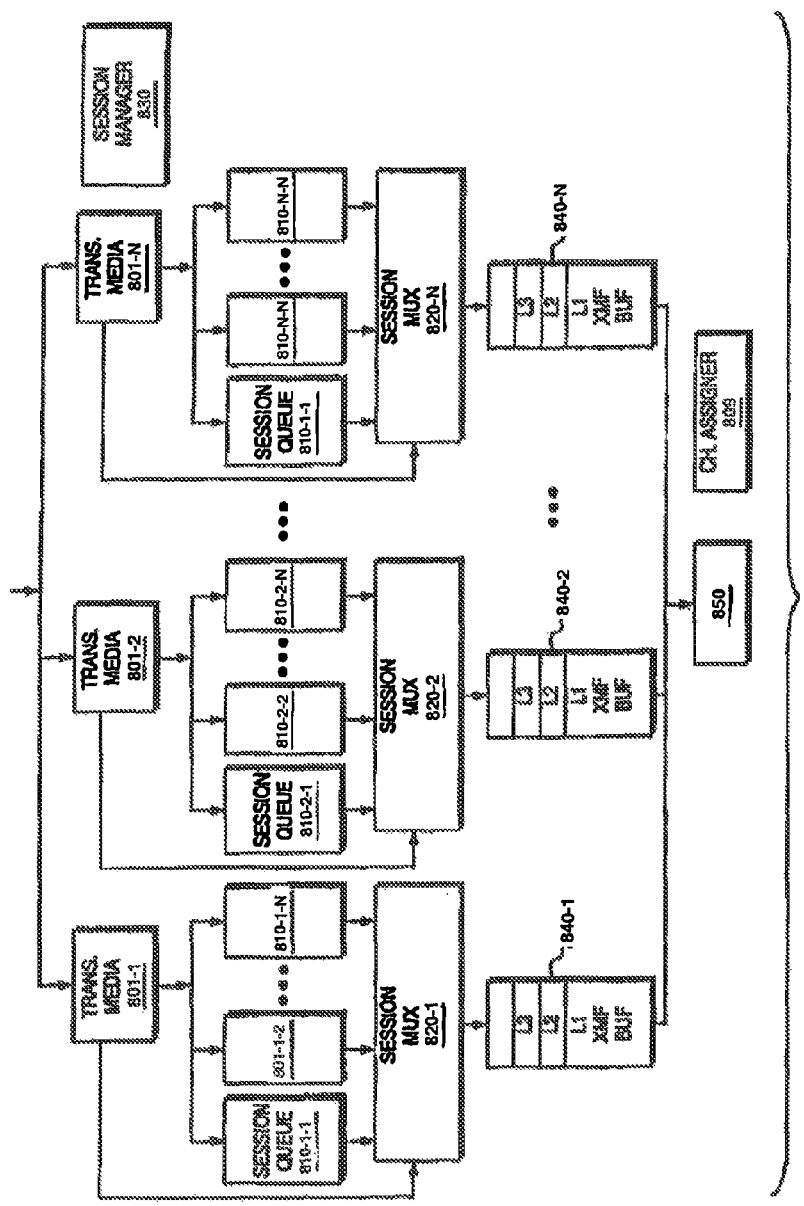
FIG. 8 illustrates the structure of session queues and data buffers used in the base station.

Before discussing how the channels are preferably allocated by the base station 504 referring to FIGS. 5 and 8 the base station 504 establishes and allocates a respective data buffer 840-1 through 840-3. Data buffers 840-1 through 840-3 store the data that is to be transmitted their respective subscriber units 501. That is, in a preferred embodiment, there is a separate data buffer in the base station 504 for each respective subscriber unit 501. As subscriber units enter into and exit out of communication sessions or connections with base station 504 the number of buffers may change. There is always a one-to-one correspondence between the number of buffers 840-1 through 840-3 allocated to the number of subscriber units 501 communicating with base station 504. The buffers 840-1 through 840-3 may be, for example, queues or other memory structures controlled by software, or may be hardware controlled fast cache memory.

The particular process which determines how channels are allocated and deallocated may reside in a data services function disposed within the upper layers of the protocols implemented in the base station 504 and subscriber units 501.

Figure 7:
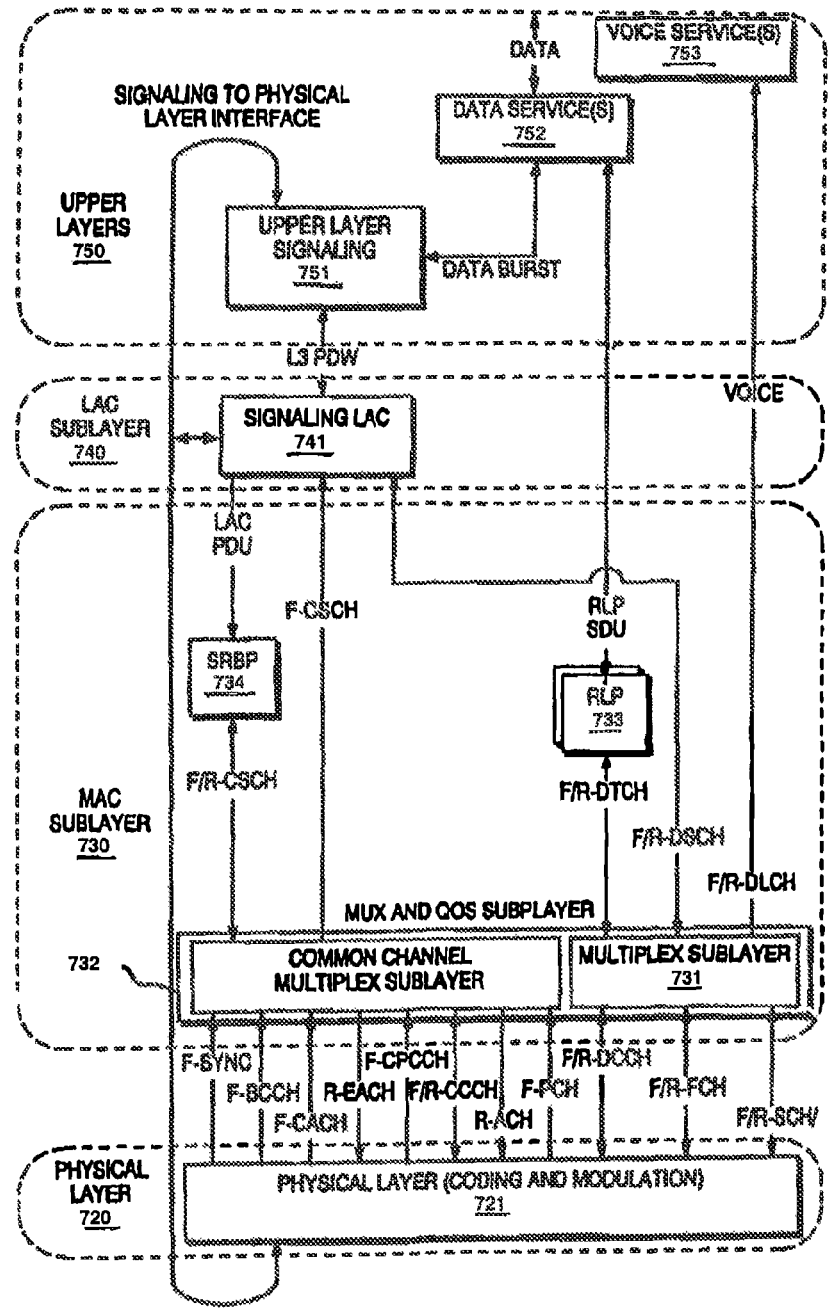
FIG. 7 is a diagram illustrating the protocol layers of a wireless communication system.

Specifically now, referring to FIG. 7, there is shown a protocol layer diagram such as typically associated with third generation (3G) wireless communication services. The protocol layers follow the open system interconnect (OSI) layered model with a physical layer 720 media access control sub layer 730 link access control (LAC) sub layer, 740 and upper communication layers 750. The physical layer 720 provides physical layer of processing such as coding and modulation of the individual logical channels. Access to the logical channels is controlled by the various functions in the MAC sub layer 730 including channel multiplex sub layer 732 multiplex control channel multiplex sub layer 731 radio link protocol sub layer 733 and SRPB 734. The signaling link access control functionality 741 is provided in the LAC sub layer 740.

Upper layers processing 750 includes upper layer signaling 751 data services 752 and voice services 753. The particular decision processes to allocate or deallocate channels to particular network layer connections resides therefore in a data services functionality 752 in the upper layers 750. The data services functionality 752 communicates with the radio link protocol 733 in the MAC sub layer 730 in order to perform functions such as to send messages to allocate and deallocate channels from end to end as demand requires.

Turning attention now to FIG. 8, various components of the base station 504 and subscriber units 501 will be described now in greater detail in connection with the process for determining when channels should be allocated or deallocated.

FIG. 8 is a more detailed diagram of the implementation of the session oriented buffering scheme implemented in the data services function 752. In particular, FIG. 8 shows how this is implemented in the base station 504. Network layer traffic is routed to the base station 504 using typical network routing protocols such as Transmission Control Protocol/Internet Protocol (TCP/IP). At the base station 504 incoming traffic is separated into individual traffic flows destined for separate subscriber units 501-1, 501-2, . . . , 501-n. The traffic flows may be separated such as by examining a destination address field in the TCP/IP header. The individual traffic flows are delivered first to transport modules 801-1, 801-2, . . . , 801-n with a transport module 801 corresponding to each of the intended subscriber units 501. A given transport module 801 is the first step in a chain of processing steps that is performed on the data intended for each subscriber unit 501. This processing chain includes not only the functionality implemented by the transport module 801 but also a number of session queues 810, a session multiplexer 820 and transmission buffers 840. The outputs of the various transmission buffers 840-1, 840-2, . . . , 840-n are then assembled by a transmit processor 850 that formats the data for transmission over the forward radio links 510.

Returning attention now to the top of the FIG. 8 again, each transport module 801 has the responsibility of either monitoring the traffic flow in such a way that it stores data belonging to different transport layer sessions in specific ones of the session queues 810 associated with that transport module

801. For example, transport module 801-1 assigned to handle data intended to be routed to subscriber unit 501-1 has associated with it a number, m, of session queues 810-1-1, 810-1-2, . . . , 810-1-m. In the preferred embodiment, a given session is characterized by a particular transport protocol in use. For example, in a session oriented transport protocol, a session queue 810 is assigned to each session. Such session transport oriented protocols include, or example, Transmission Control Protocol. In sessionless transport protocols, a session queue 810 is preferably assigned to each stream. Such sessionless protocols may for example be the User Datagram Protocol (UDP). Thus traffic destined for a particular subscriber unit 501-1 is not simply routed to the subscriber unit 501-1. First, traffic of different types are from the perspective of the transport layer are first routed to individual session queues 810-1-1, 810-1-2, . . . , 810-1-m, associated with that particular connection.

Another key function performed by the transport module 801-1 is to assign priorities to the individual queues 810-1 associated with it. It will later be understood that depending upon the bandwidth available to a particular subscriber unit 501 traffic of higher priority will be delivered to the transmission buffer 840-1 before those of lower priority. This may include traffic that is not session oriented, for example, real time traffic or streaming protocols that may be carrying voice and/or video information.

More particularly, the transport module 801-1 reports the priorities of each of the individual session queues 801-1 to its associated session multiplexer 820. Traffic of higher priority will be selected by the session multiplexer 820 for loading into the transmit buffer 840-1 for loading traffic of lower priority, in general. Traffic of equal priority will either be fairly selected such as using techniques known as weighted fair queuing (WFQ) or other schemes such as oldest queued data loaded first.

Priorities associated with each session queue may be obtained from information such as a profile data record kept for each user. For example, some users may have specified that they desire web page traffic traveling on TCP type session connections to have lower priority than streaming audio information carried on UDP type connections. Prioritization may also be based on other aspects of the data content being transmitted. For example, traffic being forwarded from a private data network may be given priority over traffic being forwarded from public networks.

Each of the session multiplexers 820-1, 820-2, . . . , 820-n, reports indications to a session manager 830 of the states of all of the session queues 810 that it is currently managing. The session manager 830 also receives indications of the present forward channel assignments given to each individual subscriber unit 501 by the channel assigner 809. The channel assigner 809 monitors the usage of the transmit buffers 840 in the base station. Upon receipt of characteristic information concerning the state of how much data is queued in respect to transmit buffers 840 the channel resource assigner 809 then determines an urgency factor representing the relative need for each subscriber unit 501 to receive data on the available forward link radio channels 510. Using these urgency factors, the channel resource assigner 809 can then dynamically assign an optimum number of channel resources to be allocated to each subscriber unit 501. Specific discussion of urgency factors in the allocation of channels is described in further detail below.

To estimate how much data may be transversing the wired network at any particular instant in time, the session manager 830 also needs to maintain a running estimate of the latency or the back call network 505 to any particular server at the other end of a transport layer session. The transport modules 801 therefore watch individual session flows from various network servers located in the wired network 505 and are therefore capable of estimating latencies such as by determining typical TCP round-trip time estimations. The transport modules 801 report this information to the session manager 830.

The session manager 830 containing all of this information can then send channel requests to the channel resource assigner 809 when it perceives that the present incoming data flow from the wired network for a particular individual subscriber unit 501-1 is greater than the data rate allowed to that subscriber unit by its present channel configuration. Recalled from above that the channel configuration may include the number of channels assigned, coding rate, and symbol modulation rate for each specific channel. Likewise, the session manager 830 notifies the channel resource assigner 809 when it is possible to release channel resources for a particular subscriber unit 501-1 if the incoming data flow from the wired network 505 is less than the maximum data rate that is presently assigned to its forward link.

If split connection transport approaches are employed, as described in RFC 2757-Long Thin Networks, of the Internet Engineering Task Force (EETF), the session manager 830 is capable of sending requests to the transport modules 801 that pause data flow for any particular session or sessions. If the session is a TCP session, the transport modules 801 can then actively place the TCP senders at the other end of the network 505 into a so-called persist mode, thereby pausing all further session flow. If the session is a streaming or unreliable protocol such as UDP, a loss profile will determine the nature of how the queued and incoming data is lost. Session information will be paused or lost if the session manager 2530 requests that more forward bandwidth should be assigned to a particular subscriber unit 2201-1 and the request denied.

If channel requests are denied, the session manager 830 then determines which session information to regulate, pause, or lose data based on content priority information. As previously mentioned, the transport session managers 830 maintain information to allow them to prioritize their individual session queues 810 based on content so these transport modules 801 can therefore choose the correct session queues to enable and/or disable based on priority.

The transmission buffers 840 are each marked with levels that are used to calculate urgency factors-for each respective buffer 840. The urgency factors are used to determine channel allocation by the channel assigner 809 on a per subscriber per content basis. The levels, indicated in FIG. 8 as L1, L2, and L3, represent demarcation points for channel allocation and/or deallocation. Specifically, when the transmission buffers 840-1 is filling and a level is traversed, an indication is sent to the channel resource assigner 809 that the subscriber unit 501-1 is likely to need more forward link bandwidth assigned. If the request is denied, the channel resource assigner 809 then sends this indication to the session manager 830.

Conversely, when the transmission buffer 840-1 is emptying, and a level is traversed, an indication is sent to the channel resource assigner 809 that the associated subscriber unit 501-1 may have forward traffic channels taken away from or deallocated without affecting end to end performance.

The levels L1, L2, . . . , L3, may therefore be termed under flow thresholds. The levels basically represent permetations of available code rate and channel code assignments for an individual subscriber unit 501. Two requirements are needed to determine the threshold levels. First, the route trip transfer time on the wired network either needs to be estimated or initial approximation needs to be set. For TCP sessions, a running round-trip time (RTT) estimation is made. For streaming oriented sessions such as UDP, another approximation can be made which for example may be a function of how much data may be queued to optimize the user's experience for a particular real time application using the UDP protocol.

Secondly, the data rate over the air interface needs to be determined. This is a function of the present code rate (CR) and number of assigned channels (NCH) allocated to a particular subscriber unit. These are the values determined by the channel resource assigner 809.

Coding rates are assigned to subscriber units 501 determined by the quality of the radio connection. For each assigned coding rate, the subscriber may also be assigned a number of channels. One scheme, therefore, allocates a Level to each available assigned channel. Thus levels L1-LC, where C indicates the number of assigned channels are available at any given instant in time to service the connection. Thus the levels, L1-LC, change each time the number of channels are assigned as well as each time the coding rate changes. Specifically, the particular buffer level associated with each L will change depending upon the available coding rate.

Figures 9, 10, 11:
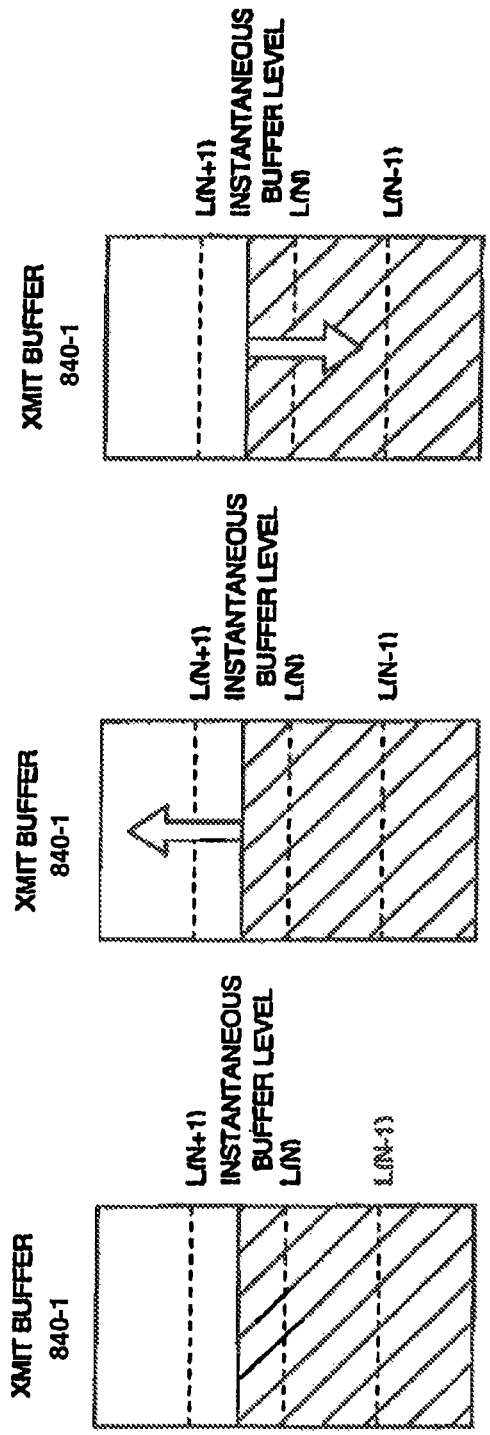
FIG. 9 is a buffer level diagram.
FIG. 10 is a buffer level diagram when resources are being added.
FIG. 11 is a buffer level diagram when resources are being taken away.

A graphical representation of a particular transmit buffer 840 is illustrated in FIG. 9. With knowledge of the round-trip transfer time in the network 505 and the current available data rate over the forward link radio channels 510 allocated to the particular subscriber unit 501 the levels L1-LC may be calculated as follows:

$Ln$=Underflow Threshold=$DR_{Air}$(code rate & channel configuration)*$\Delta t$, where $DR_{Air}$ is the data rate across the air interface, and the round-trip transfer time is either the estimated time or the set round-trip time over the wired network 505. $\Delta t$ is the time granularity used to monitor incoming data flows. If this scheme is used only to optimize TCP connection oriented sessions, $\Delta t$ can be said to either the maximum or average of all round-trip times estimated by the TCP end points, depending upon the available buffer space.

The condition for sending a request for more bandwidth to be allocated to a particular subscriber unit 501 is described by the following relationship:

$$\left[BC_{\Delta t} + \left(\sum_{i=1}^{max} Fin_i * \Delta t\right)\right] > L(n+1)$$

where $\Delta t$ is the time granularity used to monitor the incoming data flows, $BC_{\Delta t}$ represents the current transmission buffer capacity at the beginning of a particular timeframe, $Fin_1$ minus $Fin_{max}$ represents all incoming data flows from sessions or streams to the transmission buffer 840 and $L(n+1)$ is the amount of data that can be sent over the radio forward links 510 in time $\Delta t$ for the next increasing channel configuration.

Note that for session oriented TCP streams that the maximum $Fin_{Subi}$ is equal to the maximum advertised received window divided by the round-trip transfer time. This condition occurs when the combination of all incoming flows for a specific time interval is greater than the amount of data that can be transmitted during one time interval $\Delta t$ at the next increasing channel capacity assignment.

FIG. 10 represents this case graphically with the block arrow in the Figure representing the amount of flow incoming for the time frame $\Delta t$.

The condition for sending a channel deallocation request for a subscriber unit is given by the relationship:

$$\left[BC_{\Delta t} + \left(\sum_{i=1}^{max} Fin_i * \Delta t\right)\right] < L(n+1)$$

where $L(n)$ is the amount of data that can be sent over the assigned forward link channels 510 in time $\Delta t$ for the current channel configuration. This condition occurs when the combination of all incoming flows for a specific time interval, $\Delta t$ is less than the amount of data that can be transmitted during that time interval at the current channel capacity assignment. This situation is represented in the diagram of FIG. 11 with the block arrow representing the amount of flow incoming during time $\Delta t$.

Note that in an actual implementation, the transmission buffers 840 may only be theoretical queues represented by a data structure within the session manager 830 or session multiplexers 820. The transmission buffers 840 are actually the combination of all data residing in all session queues 810 for any particular subscriber unit 501. This same logic applies when determining urgency factors and levels for the transmission buffer data structures namely that such logic can be implemented within the session manager 830 and/or session multiplexers 820 rather than as a separate physical data storage structure and associated logic.

The present invention therefore provides an advantageous way in which transmission queues may be loaded and how additional resources may be requested and/or may be allocated and/or deallocated on a per subscriber basis. Individual transmission queues intended for particular subscribers may therefore be monitored for data level and channels assigned or deassigned depending upon observed buffer filling rates. The channel resource assigner 809 therefore has knowledge of the types of traffic flow through the base station based upon application content. This allows more intelligent efficient channel allocation when there is competition for the available resources. Thus by having transport layer aware channel allocation and deallocation coupled with calculation of overflow and underflow threshold based upon current configured forward link radio channel capacity, the connection between the base station and the subscriber unit in the forward link direction may be optimized.

While this present invention has been particularly shown and described with references to preferred embodiments thereof, it will be understood by those skilled in the art that various changes in form and detail may be made therein without departing from the spirit and scope of the invention as defined by the appended claims. Those skilled in the art will recognize or be able to ascertain using no more than routine experimentation, may equivalents to the specific embodiments of the invention described specifically herein. Such equivalents are intended to be encompassed in the scope of the claims.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A subscriber unit comprising:
circuitry configured to establish a packet data connection with the network to transfer packet data using at least one wireless channel;
wherein the circuitry is further configured to release all the wireless channels and subsequently transfer packet data using at least one wireless channel utilizing the packet data connection;
wherein the circuitry is further configured to transfer voice and packet data over a plurality of wireless channels; and
wherein the plurality of wireless channels varies in response to commands from a base station, wherein the commands are based on an urgency factor, U, for each of M buffers, where M is the total number of buffers used in the reverse and forward links and the urgency factor for the buffers servicing the forward links are calculated independently of urgency factors for the other buffers servicing the reverse links, and the buffers servicing each transmission direction of a particular connection between a particular one of the subscriber units and the base station are independent of one another.

2. The subscriber unit of claim 1 wherein the plurality of wireless channels are CDMA channels.

3. The subscriber unit of claim 1 wherein the plurality of wireless channels are TDMA channels.

4. The subscriber unit of claim 1 wherein the circuitry is further configured to receive layer 2 formatted data comprising a flag field.

5. The subscriber unit of claim 1 wherein the circuitry is further configured to transmit layer 2 formatted data comprising termination information.

6. The subscriber unit of claim 1 wherein the transfer of packet data is temporary.

7. The subscriber unit of claim 1 wherein the circuitry is further configured to transmit layer 2 formatted data comprising a sequence number and a control field.

* * * * *